United States Patent
Lin et al.

(10) Patent No.: US 11,494,870 B2
(45) Date of Patent: Nov. 8, 2022

(54) METHOD AND APPARATUS FOR REDUCING ARTIFACTS IN PROJECTION-BASED FRAME

(71) Applicant: MEDIATEK INC., Hsin-Chu (TW)

(72) Inventors: Jian-Liang Lin, Hsinchu (TW); Peng Wang, Beijing (CN); Ya-Hsuan Lee, Hsinchu (TW); Hung-Chih Lin, Hsinchu (TW); Shen-Kai Chang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 268 days.

(21) Appl. No.: 16/639,118

(22) PCT Filed: Aug. 17, 2018

(86) PCT No.: PCT/CN2018/100933
§ 371 (c)(1),
(2) Date: Feb. 13, 2020

(87) PCT Pub. No.: WO2019/034131
PCT Pub. Date: Feb. 21, 2019

(65) Prior Publication Data
US 2020/0234399 A1 Jul. 23, 2020

Related U.S. Application Data

(60) Provisional application No. 62/563,787, filed on Sep. 27, 2017, provisional application No. 62/547,126, filed on Aug. 18, 2017.

(51) Int. Cl.
*G06T 3/00* (2006.01)
*H04N 19/597* (2014.01)
(Continued)

(52) U.S. Cl.
CPC ............ *G06T 3/0062* (2013.01); *G06T 3/005* (2013.01); *G06T 19/20* (2013.01); *H04N 19/597* (2014.11); *H04N 19/85* (2014.11); *H04N 19/86* (2014.11)

(58) Field of Classification Search
None
See application file for complete search history.

(56) References Cited

U.S. PATENT DOCUMENTS

| | | | |
|---|---|---|---|
| 6,781,598 B1 | 8/2004 | Yamamoto |
| 8,786,675 B2 | 7/2014 | Deering |

(Continued)

FOREIGN PATENT DOCUMENTS

| | | |
|---|---|---|
| CN | 101002474 A | 7/2007 |
| CN | 101127911 A | 2/2008 |

(Continued)

OTHER PUBLICATIONS

Kashyap Kammachi-Sreedhar et al., AHG8: Nested polygonal chain packing of 360-degree ERP pictures, Joint Video Exploration Team (JVET) of ITU-T SG 16 WP 3 and ISO/IEC JTC 1/SC 29/WG 11, 5th Meeting, Jan. 12-20, 2017, pp. 1-3, JVET-E0090v2, Nokia, Geneva, CH.

(Continued)

*Primary Examiner* — Stefan Gadomski
(74) *Attorney, Agent, or Firm* — Winston Hsu

(57) ABSTRACT

An exemplary video processing method includes: receiving an omnidirectional content corresponding to a sphere; obtaining a plurality of projection faces from the omnidirectional content of the sphere according to a pyramid projection; creating at least one padding region; and generating a projection-based frame by packing the projection faces and the at least one padding region in a pyramid projection layout. The projection faces packed in the pyra- (Continued)

mid projection layout include a first projection face. The at least one padding region packed in the pyramid projection layout includes a first padding region. The first padding region connects with at least the first projection face, and forms at least a portion of one boundary of the pyramid projection layout.

10 Claims, 22 Drawing Sheets

(51) Int. Cl.
*H04N 19/85* (2014.01)
*G06T 19/20* (2011.01)
*H04N 19/86* (2014.01)

(56) References Cited

U.S. PATENT DOCUMENTS

| | | | |
|---|---|---|---|
| 9,665,978 B2 * | 5/2017 | Chuang | G06T 17/20 |
| 9,721,393 B1 | 8/2017 | Dunn | |
| 10,356,386 B2 | 7/2019 | Lee | |
| 2004/0105597 A1 | 6/2004 | Lelescu | |
| 2009/0123088 A1 | 5/2009 | Kallay | |
| 2014/0152655 A1 | 6/2014 | Johnston | |
| 2014/0218354 A1 | 8/2014 | Park | |
| 2016/0088282 A1 | 3/2016 | Sadi | |
| 2016/0352791 A1 | 12/2016 | Adams | |
| 2016/0353146 A1 | 12/2016 | Weaver | |
| 2017/0045941 A1 | 2/2017 | Tokubo | |
| 2017/0084073 A1 | 3/2017 | Pio | |
| 2017/0251204 A1 | 8/2017 | Gupte | |
| 2017/0280126 A1 | 9/2017 | Van der Auwera | |
| 2017/0295356 A1 * | 10/2017 | Abbas | H04N 13/344 |
| 2017/0358126 A1 * | 12/2017 | Lim | G06T 9/001 |
| 2018/0027257 A1 | 1/2018 | Izumi | |
| 2018/0077451 A1 * | 3/2018 | Yip | H04N 13/117 |
| 2018/0098131 A1 * | 4/2018 | Zhou | H04N 21/6373 |
| 2018/0167613 A1 | 6/2018 | Hannuksela | |
| 2018/0192001 A1 * | 7/2018 | Boyce | H04N 7/147 |
| 2018/0249164 A1 | 8/2018 | Kim | |
| 2018/0262775 A1 | 9/2018 | Lee | |
| 2018/0288363 A1 | 10/2018 | Amengual Galdon | |
| 2018/0332265 A1 * | 11/2018 | Hwang | H04N 21/8451 |
| 2018/0342043 A1 * | 11/2018 | Vandrotti | H04N 13/117 |
| 2018/0357804 A1 | 12/2018 | Forutanpour | |
| 2018/0359487 A1 | 12/2018 | Bang | |
| 2018/0376126 A1 * | 12/2018 | Hannuksela | H04N 19/132 |
| 2019/0005709 A1 | 1/2019 | Kim | |
| 2019/0012839 A1 * | 1/2019 | Wang | G06T 19/006 |
| 2019/0026858 A1 | 1/2019 | Lin | |
| 2019/0158815 A1 * | 5/2019 | He | H04N 19/597 |
| 2019/0188828 A1 | 6/2019 | Aggarwal | |
| 2019/0215532 A1 | 7/2019 | He | |
| 2019/0253624 A1 | 8/2019 | Kim | |

FOREIGN PATENT DOCUMENTS

| | | |
|---|---|---|
| CN | 101002474 B | 4/2010 |
| CN | 104219584 A | 12/2014 |
| CN | 105898254 A | 8/2016 |
| CN | 105915907 A | 8/2016 |
| CN | 205545713 U | 8/2016 |
| CN | 106056531 A | 10/2016 |
| CN | 106162139 A | 11/2016 |
| CN | 205721064 U | 11/2016 |
| CN | 106358033 A | 1/2017 |
| CN | 106686381 A | 5/2017 |
| CN | 106846245 A | 6/2017 |
| CN | 107622474 A | 1/2018 |
| JP | 2000-67227 A | 3/2000 |
| JP | 2007-257100 A | 10/2007 |
| WO | 2004/047426 A2 | 6/2004 |
| WO | 2006/016781 A1 | 2/2006 |
| WO | 2016/140082 A1 | 9/2016 |
| WO | 2016/171404 A1 | 10/2016 |
| WO | 2017/158236 A2 | 9/2017 |
| WO | WO-2017205794 A1 * | 11/2017 ........... H04N 13/117 |
| WO | 2017/217763 A1 | 12/2017 |
| WO | 2018/064965 A1 | 4/2018 |

OTHER PUBLICATIONS

Peng Wang et al., AHG 8: A viewport-based pyramid projection for VR360 video streaming, Joint Video Exploration Team (JVET) of ITU-T SG 16 WP 3 and ISO/IEC JTC 1/SC 29/WG 11, 5th Meeting, Jan. 12-20, 2017, pp. 1-4, JVET-E0058, MediaTek Inc., Geneva, CH.

Yan Ye et al., Algorithm descriptions of projection format conversion and video quality metrics in 360Lib, Joint Video Exploration Team (JVET) of ITU-T SG 16 WP 3 and ISO/IEC JTC 1/SC 29/WG 11, 5th Meeting, Jan. 12-20, 2017, pp. 1-22, JVET-E1003, InterDigital Communications, Samsung Electronics, Intel, Geneva, CH.

"International Search Report" dated Nov. 16, 2018 for International application No. PCT/CN2018/100933, International filing date:Aug. 17, 2018.

"International Search Report" dated May 31, 2018 for International application No. PCT/CN2018/078785, International filing date:Mar. 13, 2018.

"International Search Report" dated Jun. 22, 2018 for International application No. PCT/CN2018/081723, International filing date:Apr. 3, 2018.

"International Search Report" dated Dec. 28, 2018 for International application No. PCT/CN2018/107351, International filing date:Sep. 25, 2018.

Thomas Engelhardt et al., Octahedron Environment Maps, http://www.vis.uni-stutt gart.de/engelhts/paper/vmvOctaMaps.pdf, Topics 1-6, Figures 1 and 4, 2008, USA.

K. Kammachi Sreedhar et al., AHG8: Test results for viewport-dependent pyramid, cube map, and equirectangular panorama schemes, Joint Video Exploration Team (JVET) of ITU-T SG 16 WP 3 and ISO/IEC JTC 1/SC29/WG 11, 4th Meeting: Chengdu, CN, Oct. 15-21, 2016, Document: JVET-D0078, Summary, Section 1.1-1.4, Figures 2-4.

* cited by examiner

METHOD AND APPARATUS FOR REDUCING ARTIFACTS IN PROJECTION-BASED FRAME

CROSS REFERENCE TO RELATED APPLICATIONS

This application claims the benefit of U.S. provisional application No. 62/547,126 filed on Aug. 18, 2017 and U.S. provisional application No. 62/563,787 filed on Sep. 27, 2017. The entire contents of the related applications, including U.S. provisional application No. 62/547,126 and U.S. provisional application No. 62/563,787, are incorporated herein by reference.

BACKGROUND

The present invention relates to processing an omnidirectional image/video content, and more particularly, to a method and an apparatus for reducing artifacts in a projection-based frame.

Virtual reality (VR) with head-mounted displays (HMDs) is associated with a variety of applications. The ability to show wide field of view content to a user can be used to provide immersive visual experiences. A real-world environment has to be captured in all directions resulting in an omnidirectional image/video content corresponding to a sphere. With advances in camera rigs and HMDs, the delivery of VR content may soon become the bottleneck due to the high bitrate required for representing such a 360-degree image/video content. When the resolution of the omnidirectional video is 4K or higher, data compression/encoding is critical to bitrate reduction.

In general, the omnidirectional image/video content corresponding to the sphere is transformed into a sequence of images, each of which is a projection-based frame with a 360-degree image/video content represented by one or more projection faces arranged in a 360-degree Virtual Reality (360 VR) projection layout, and then the sequence of the projection-based frames is encoded into a bitstream for transmission. If the employed 360 VR projection layout is not properly designed, it is possible that artifacts are introduced by encoding of the projection-based frame and/or projection layout conversion of the projection-based frame, thus leading to image quality degradation.

SUMMARY

One of the objectives of the claimed invention is to provide a method and an apparatus for reducing artifacts in a projection-based frame.

According to a first aspect of the present invention, an exemplary video processing method is disclosed. The exemplary video processing method includes: receiving an omnidirectional content corresponding to a sphere; obtaining a plurality of projection faces from the omnidirectional content of the sphere according to a pyramid projection; creating, by a padding circuit, at least one padding region; and generating a projection-based frame by packing the projection faces and said at least one padding region in a pyramid projection layout, wherein the projection faces packed in the pyramid projection layout comprise a first projection face; said at least one padding region packed in the pyramid projection layout comprises a first padding region; the first padding region connects with at least the first projection face, and forms at least a portion of one boundary of the pyramid projection layout.

According to a second aspect of the present invention, an exemplary video processing method is disclosed. The exemplary video processing method includes: obtaining a plurality of projection faces from an omnidirectional content of a sphere according to a 360-degree Virtual Reality (360 VR) projection, wherein the projection faces comprises a first projection face and a second projection face, and there is an image content continuity edge between one side of the first projection face and one side of the second projection face if said one side of the first projection face connects with said one side of the second projection face; generating, by a padding circuit, at least one padding region, wherein said at least one padding region comprises a first padding region; and combining said at least one padding region and the projection faces, wherein the first padding region connects with said one side of the first projection face and said one side of the second projection face for isolating said one side of the first projection face from said one side of the second projection face.

According to a third aspect of the present invention, an exemplary video processing method is disclosed. The exemplary video processing method includes: receiving an omnidirectional content corresponding to a sphere; obtaining a plurality of projection faces from the omnidirectional content of the sphere, wherein the projection faces comprise a first projection face corresponding to a main view and at least one second projection face corresponding to a non-main view; and generating a projection-based frame by packing the projection faces in a viewport-based projection layout and applying smooth filtering to at least a portion of said at least one second projection face.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
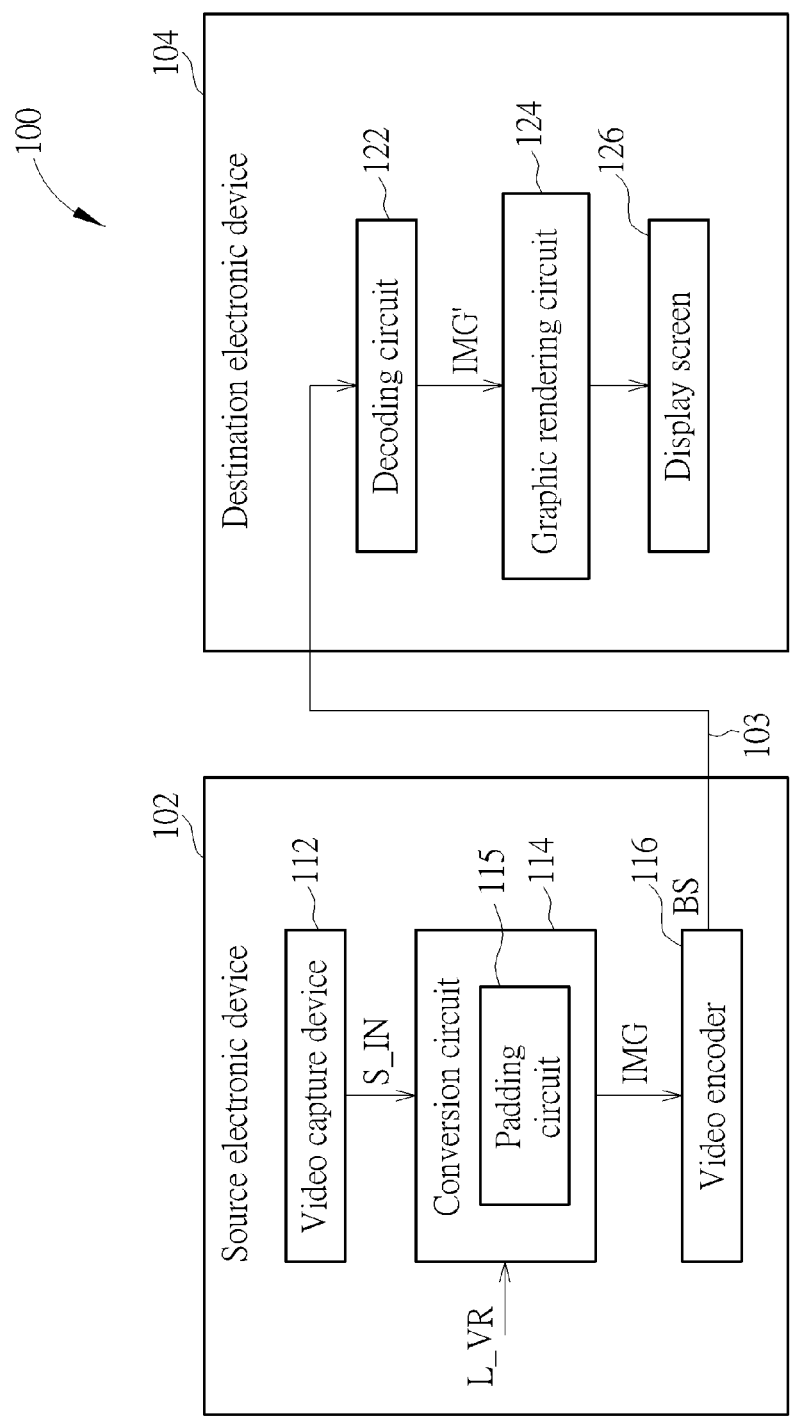
FIG. 1 is a diagram illustrating a first 360-degree Virtual Reality (360 VR) system according to an embodiment of the present invention.

FIG. 1 is a diagram illustrating a first 360-degree Virtual Reality (360 VR) system according to an embodiment of the present invention. The 360 VR system 100 includes two video processing apparatuses (e.g., a source electronic device 102 and a destination electronic device 104). The source electronic device 102 includes a video capture device 112, a conversion circuit 114, and a video encoder 116. For example, the video capture device 112 may be a set of cameras used to provide an omnidirectional image/video content (e.g., multiple images that cover the whole surroundings) S_IN corresponding to a sphere. The conversion circuit 114 is coupled between the video capture device 112 and the video encoder 116. The conversion circuit 114 generates a projection-based frame IMG with a 360-degree Virtual Reality (360 VR) projection layout L_VR according to the omnidirectional image/video content S_IN. The projection-based frame IMG may be one frame included in a sequence of projection-based frames generated from the conversion circuit 114. The video encoder 116 is an encoding circuit used to encode/compress the projection-based frame IMG to generate a part of a bitstream BS. Further, the video encoder 116 outputs the bitstream BS to the destination electronic device 104 via a transmission means 103. For example, the sequence of projection-based frames may be encoded into the bitstream BS, and the transmission means 103 may be a wired/wireless communication link or a storage medium.

The destination electronic device 104 may be a head-mounted display (HMD) device. As shown in FIG. 1, the destination electronic device 104 includes a decoding circuit 122, a graphic rendering circuit 124, and a display screen 126. The decoding circuit 122 receives the bitstream BS from the transmission means 103 (e.g., a wired/wireless communication link or a storage medium), and performs a video decoder function for decoding a part of the received bitstream BS to generate a decoded frame IMG'. For example, the decoding circuit 122 generates a sequence of decoded frames by decoding the received bitstream BS, where the decoded frame IMG' is one frame included in the sequence of decoded frames. In this embodiment, the projection-based frame IMG to be encoded by the video encoder 116 at the encoder side has a 360 VR projection format with a projection layout. Hence, after the bitstream BS is decoded by the decoding circuit 122 at the decoder side, the decoded frame IMG' has the same 360 VR projection format and the same projection layout. In other words, the decoded frame IMG' is a decoded projection-based frame having the same 360 VR projection layout L_VR employed by the conversion circuit 114. The graphic rendering circuit 124 is coupled between the decoding circuit 122 and the display screen 126. The graphic rendering circuit 124 renders and displays an output image data on the display screen 126 according to the decoded frame IMG'. For example, a viewport area associated with a portion of the 360-degree image/video content carried by the decoded frame IMG' may be displayed on the display screen 126 via the graphic rendering circuit 124.

Figure 2:
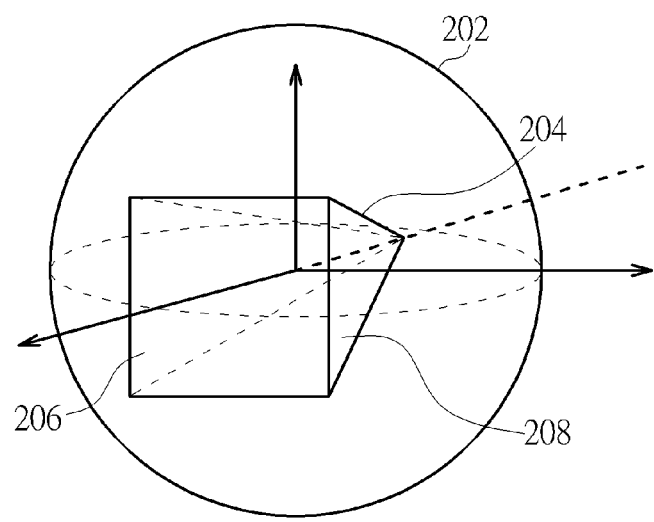
FIG. 2 is a diagram illustrating a pyramid projection according to an embodiment of the present invention.
Figure 3:
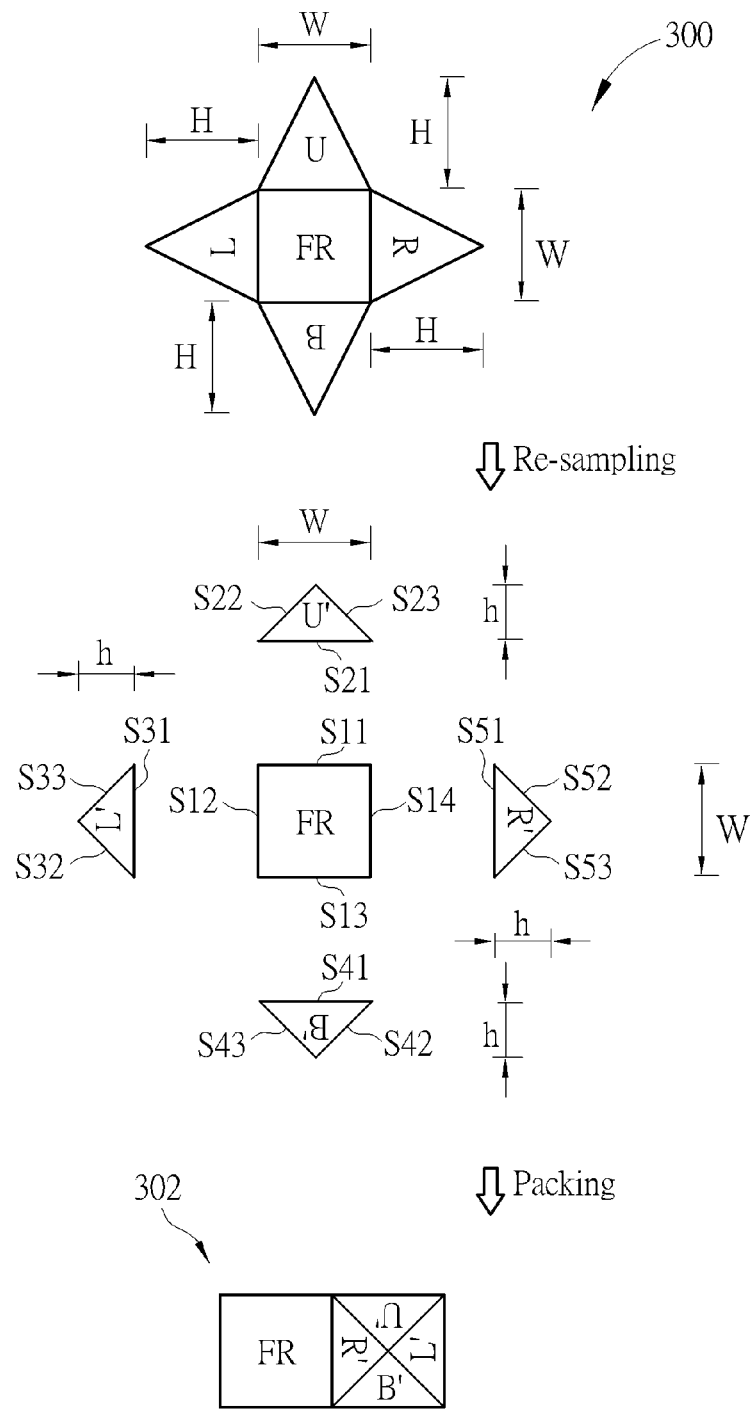
FIG. 3 is a diagram illustrating a viewport-based pyramid projection layout according to an embodiment of the present invention.

In this embodiment, the 360 VR projection layout L_VR may be a pyramid projection layout with boundary padding. FIG. 2 is a diagram illustrating a pyramid projection according to an embodiment of the present invention. FIG. 3 is a diagram illustrating a viewport-based pyramid projection layout according to an embodiment of the present invention. In accordance with an exemplary pyramid projection type, a pyramid 204 is fully inside a sphere 202, where the pyramid 204 consists of a base 206 and a plurality of lateral projection faces 208. In this example, a shape of the base 206 is a square, and a shape of each of the lateral projection faces 208 is a triangle. An omnidirectional image/video content of the sphere 202 is mapped/projected onto the base 206 and the lateral projection faces 208 of the pyramid 204, thus resulting in five projection faces including one base projection face (labeled by "FR") and four lateral projection faces (labeled by "U", "L", "B", and "R").

As shown the top part of FIG. 3, a shape of the base projection face FR is a square, and a shape of each of the lateral projection faces U, L, B, and R is a triangle. In addition, the base projection face FR and the lateral projection faces U, L, B, and R are arranged in a pyramid projection layout 300 corresponding to an unfolded pyramid, such that the lateral projection faces U, L, B, and R connect with four sides/edges of the base projection face FR, respectively. It should be noted that an image content continuity edge exists between the lateral projection face U and the base projection face FR, an image content continuity edge exists between the lateral projection face L and the base projection face FR, an image content continuity edge exists between the lateral projection face B and the base projection face FR, and an image content continuity edge exists between the lateral projection face R and the base projection face FR. The width of each lateral projection face U/B/L/R (i.e., the length of a base of a triangle) is W, and the height of each lateral projection face U/B/L/R (i.e., the distance from the top of the triangle to the base of the triangle) is H. It should be noted that the width W of each lateral projection face U/B/L/R is equal to the edge length of the base projection face FR.

The viewport-based pyramid projection layout 302 may be derived from the pyramid projection layout 300 with projection face re-sampling (e.g., projection face down-scaling). As shown in the middle part of FIG. 3, a lateral projection face U' is a re-sampled projection face obtained by re-sampling (e.g., down-scaling) the lateral projection face U in its height direction with a pre-defined re-sampling factor s (s=H/h), a lateral projection face B' is a re-sampled projection face obtained by re-sampling (e.g., down-scaling) the lateral projection face B in its height direction with the pre-defined re-sampling factor s (s=H/h), a lateral projection face L' is a re-sampled projection face obtained by re-sampling (e.g., down-scaling) the lateral projection face L in its height direction with the pre-defined re-sampling factor s (s=H/h), and a lateral projection face R' is a re-sampled projection face obtained by re-sampling (e.g., down-scaling) the lateral projection face R in its height direction with the pre-defined re-sampling factor s (s=H/h). Re-sampling may be performed by uniform mapping or non-uniform mapping, depending upon the actual design considerations.

In this example, a shape of the base projection face FR is a square, and a shape of each of the lateral projection faces U', B', L' and R' is a right triangle. Specifically, the base projection face FR has four sides S11, S12, S13, and S14; the lateral projection face U' has one hypotenuse S21 and two cathetuses (legs) S22 and S23; the lateral projection face L' has one hypotenuse S31 and two cathetuses (legs) S32 and S33; the lateral projection face B' has one hypotenuse S41 and two cathetuses (legs) S42 and S43; and the lateral projection face R' has one hypotenuse S51 and two cathetuses (legs) S52 and S53.

Moreover, the base projection face FR in the pyramid projection layout 300 corresponds to a user's viewport (i.e., a main view), and may be directly used as a base projection face needed by the viewport-based pyramid projection layout 302. The base projection face FR (which is a square projection face corresponding to a main view) and the four lateral projection faces U', B', L', and R' (which are right-triangle-shaped projection faces corresponding to a non-main view) are packed in the viewport-based pyramid projection layout 302. As shown in the bottom part of FIG. 3, hypotenuse S51 of the lateral projection face R' connects with side S14 of the base projection face FR, cathetus S52 of the lateral projection face R' connects with cathetus S23 of the lateral projection face U', cathetus S53 of the lateral projection face R' connects with cathetus S42 of the lateral projection face B', cathetus S33 of the lateral projection face L' connects with cathetus S22 of the lateral projection face U', and cathetus S32 of the lateral projection face L' connects with cathetus S43 of the lateral projection face B'.

As mentioned above, the pyramid projection layout 300 corresponds to an unfolded pyramid, where an image content continuity edge exists between the lateral projection face U and the base projection face FR, an image content continuity edge exists between the lateral projection face L and the base projection face FR, an image content continuity edge exists between the lateral projection face B and the base projection face FR, and an image content continuity edge exists between the lateral projection face R and the base projection face FR. Since the lateral projection face U' is a re-sampled version of the lateral projection face U, the lateral projection face B' is a re-sampled version of the lateral projection face B, the lateral projection face L' is a re-sampled version of the lateral projection face L, and the lateral projection face R' is a re-sampled version of the lateral projection face R, an image content continuity edge exists between the hypotenuse S51 of the lateral projection face R' and the side S14 of the base projection face FR, an image content continuity edge exists between the cathetus S52 of the lateral projection face R' and the cathetus S23 of the lateral projection face U', an image content continuity edge exists between the cathetus S53 of the lateral projection face R' and the cathetus S42 of the lateral projection face B', an image content continuity edge exists between the cathetus S33 of the lateral projection face L' and the cathetus S22 of the lateral projection face U', and an image content continuity edge exists between the cathetus S32 of the lateral projection face L' and the cathetus S43 of the lateral projection face B'.

Compared to the pyramid projection layout 300, the viewport-based pyramid projection layout 302 is more compact due to the fact that a shape of the viewport-based pyramid projection layout 302 is a rectangle. In this way, a compact viewport-based pyramid projection layout is achieved, and can be used by the projection-based frame IMG to avoid the use of dummy areas (e.g., black areas, grey areas, or white areas) in the projection-based frame IMG. Further, the 360-degree image/video content is continuously represented in the base projection face FR and the lateral projection faces U', B', L', and R' with no image content discontinuity. That is, there is no image content discontinuity edge caused by packing of projection faces. In this way, the coding efficiency is not degraded by the viewport-based pyramid projection layout 302.

However, the projection-based frame IMG after coding may have artifacts due to discontinuous boundaries of the viewport-based pyramid projection layout 302. As shown in FIG. 3, an image content continuity edge between the base projection face FR and the lateral projection face U in the pyramid projection layout 300 does not exist in the viewport-based pyramid projection layout 302, such that the side S11 of the base projection face FR and the hypotenuse S21 of the lateral projection face U' form a discontinuous top boundary of the viewport-based pyramid projection layout 302. Similarly, an image content continuity edge between the base projection face FR and the lateral projection face L in the pyramid projection layout 300 does not exist in the viewport-based pyramid projection layout 302, such that the side S12 of the base projection face FR forms a discontinuous left boundary of the viewport-based pyramid projection layout 302, and the hypotenuse S31 of the lateral projection face L' form a discontinuous right boundary of the viewport-based pyramid projection layout 302; and an image content continuity edge between the base projection face FR and the lateral projection face B in the pyramid projection layout 300 does not exist in the viewport-based pyramid projection layout 302, such that the side S13 of the base projection face FR and the hypotenuse S41 of the lateral projection face B' form a discontinuous bottom boundary of the viewport-based pyramid projection layout 302.

To address the above issue, the present invention proposes an innovative pyramid projection layout design with boundary padding that is capable of reducing artifacts at boundaries of a pyramid projection layout (e.g., viewport-based pyramid projection layout 302) after coding. For example, the conversion circuit 114 receives an omnidirectional image/video content of the sphere 202 from the video capture devoice 112, and obtains a plurality of projection faces (e.g., base projection face FR and lateral projection faces U', B', L', R') from the omnidirectional image/video content of the sphere 202 according to a pyramid projection. As shown in FIG. 1, the conversion circuit 114 has a padding circuit 115 that is arranged to generate at least one padding region. The conversion circuit 114 creates the projection-based frame IMG by packing the projection faces (e.g., base projection face FR and lateral projection faces U', B', L', R') and at least one padding region (e.g., four padding regions) in a proposed pyramid projection layout with boundary padding. For example, the projection faces packed in the proposed pyramid projection layout with boundary padding include a first projection face. The at least one padding region packed in the proposed pyramid projection layout includes a first padding region. The first padding region connects with at least the first projection face, and forms at least a portion (i.e., part or all) of one boundary of the proposed pyramid projection layout.

Figure 4:
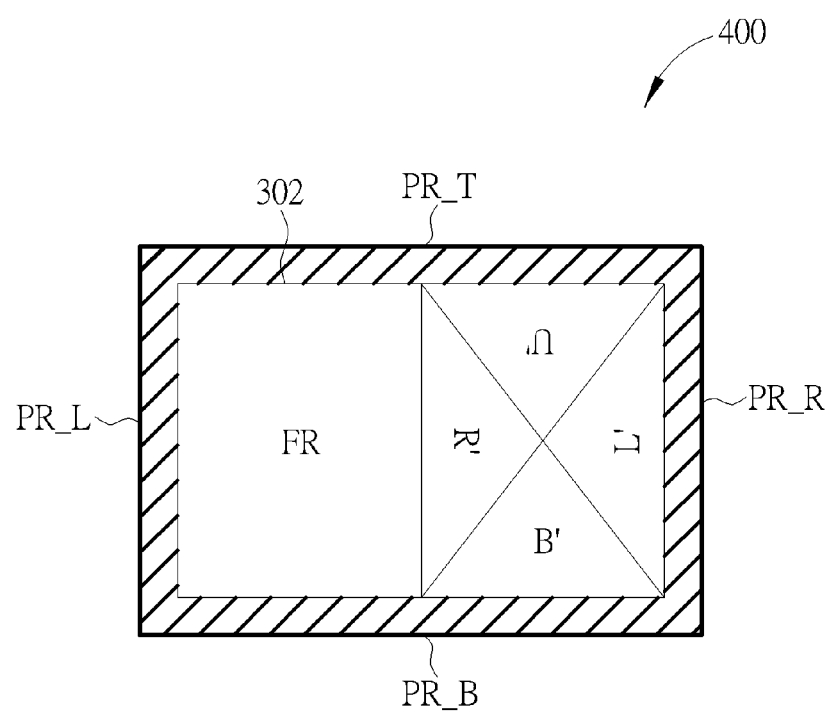
FIG. 4 is a diagram illustrating a viewport-based pyramid projection layout with boundary padding according to an embodiment of the present invention.

FIG. 4 is a diagram illustrating a viewport-based pyramid projection layout with boundary padding according to an embodiment of the present invention. The 360 VR projection layout L_VR used by the conversion circuit 114 may be set by the proposed pyramid projection layout 400 shown in FIG. 4. The padding circuit 115 adds a padding region PR_T to the top boundary of the viewport-based pyramid projection layout 302, adds a padding region PR_B to the bottom boundary of the viewport-based pyramid projection layout 302, adds a padding region PR_L to the left boundary of the viewport-based pyramid projection layout 302, and adds a padding region PR_R to the right boundary of the viewport-based pyramid projection layout 302. Hence, the added padding region PR_T forms a top boundary of the viewport-based pyramid projection layout 400, the added padding region PR_B forms a bottom boundary of the viewport-based pyramid projection layout 400, the added padding region PR_L forms a left boundary of the viewport-based pyramid projection layout 400, and the added padding region PR_R forms a right boundary of the viewport-based pyramid projection layout 400.

In a first exemplary boundary padding design, the padding circuit 115 applies geometry padding to a projection face to determine pixel values of pixels included in a padding region that connects with the projection face. Hence, the padding region PR_T includes a left geometry mapping region and a right geometry mapping region. The content of a region on a sphere (e.g., sphere 202 shown in FIG. 2) is mapped onto the left geometry mapping region of the padding region PR_T, where the region on the sphere is adjacent to a region from which the base projection face FR is obtained. In addition, the content of a region on a sphere (e.g., sphere 202 shown in FIG. 2) is mapped onto the right geometry mapping region of the padding region PR_T, where the region on the sphere is adjacent to a region from which the lateral projection face U' is obtained. Hence, there is image content continuity between the base projection face FR and the left geometry mapping region of the padding region PR_T, and there is image content continuity between the lateral projection face U' and the right geometry mapping region of the padding region PR_T. That is, content is continuously represented in the base projection face FR and the left geometry mapping region of the padding region PR_T, and content is continuously represented in the lateral projection face U' and the right geometry mapping region of the padding region PR_T.

The padding region PR_B includes a left geometry mapping region and a right geometry mapping region. The content of a region on a sphere (e.g., sphere 202 shown in FIG. 2) is mapped onto the left geometry mapping region of the padding region PR_B, where the region on the sphere is adjacent to a region from which the base projection face FR is obtained. Similarly, the content of a region on a sphere (e.g., sphere 202 shown in FIG. 2) is mapped onto the right geometry mapping region of the padding region PR_B, where the region on the sphere is adjacent to a region from which the lateral projection face B' is obtained. Hence, there is image content continuity between the base projection face FR and the left geometry mapping region of the padding region PR_B, and there is image content continuity between the lateral projection face B' and the right geometry mapping region of the padding region PR_B. That is, content is continuously represented in the base projection face FR and the left geometry mapping region of the padding region PR_B, and content is continuously represented in the lateral projection face B' and the right geometry mapping region of the padding region PR_B.

The padding region PR_L includes a single geometry mapping region. The content of a region on a sphere (e.g., sphere 202 shown in FIG. 2) is mapped onto the single geometry mapping region of the padding region PR_L, where the region on the sphere is adjacent to a region from which the base projection face FR is obtained. Hence, there is image content continuity between the base projection face FR and the padding region PR_L. That is, content is continuously represented in the base projection face FR and the padding region PR_L.

The padding region PR_R includes a single geometry mapping region. The content of a region on a sphere (e.g., sphere 202 shown in FIG. 2) is mapped onto the single geometry mapping region of the padding region PR_R, where the region on the sphere is adjacent to a region from which the lateral projection face L' is obtained. Hence, there is image content continuity between the lateral projection face L' and the padding region PR_R. That is, content is continuously represented in the lateral projection face L' and the padding region PR_R.

Figure 5:
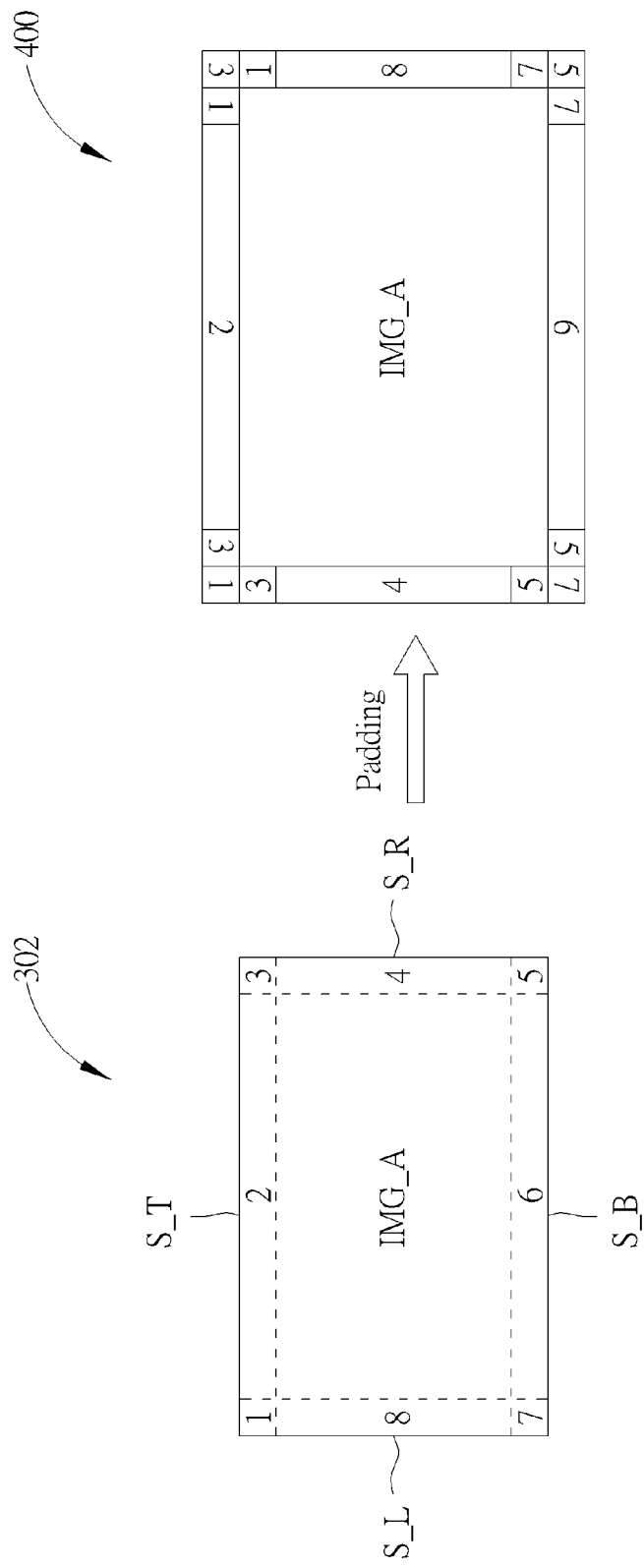
FIG. 5 is a diagram illustrating boundary padding regions generated by pixel duplication according to an embodiment of the present invention.

In a second exemplary boundary padding design, the padding circuit 115 sets pixel values of pixels included in a padding region by duplicating pixel values of pixels included in a projection face that connects with the padding region. FIG. 5 is a diagram illustrating boundary padding regions generated by pixel duplication according to an embodiment of the present invention. An image IMG_A is represented by a base projection face and a plurality of lateral projection faces packed in the viewport-based pyramid projection layout 302 without padding. The viewport-based pyramid projection layout 302 has a top side S_T, a bottom side S_B, a left side S_L and a right side S_R. The top side S_T, bottom side S_B, left side S_L and right side S_R are four boundaries of the viewport-based pyramid projection layout 302. In addition, the image IMG_A has a plurality of image areas (labeled by reference numbers "1", "2", "3", "4", "5", "6", "7", and "8"). The image areas "1"-"3" form one partial region, and include boundary pixels at the top side S_T. The image areas "3"-"5" form one partial region, and include boundary pixels at the right side S_R. The image areas "5"-"7" form one partial region, and include boundary pixels at the bottom side S_B. The image areas "7"-"8" and "1" form one partial region, and include boundary pixels at the left side S_L.

The 360 VR projection layout L_VR employed by the conversion circuit 114 may be set by a viewport-based pyramid projection layout with padding (e.g., viewport-based pyramid projection layout 400 shown in FIG. 4). As shown in FIG. 5, the viewport-based pyramid projection layout 400 is derived from the viewport-based pyramid projection layout 302 by pixel duplication. A first padding region connected with the left side S_L of the image IMG_A (e.g., at least a portion of the padding region PR_L shown in FIG. 4) is generated by duplicating the image areas "3"-"5" of the image IMG_A, a second padding region connected with the right side S_R of the image IMG_A (e.g., at least a portion of the padding region PR_R shown in FIG. 4) is generated by duplicating the image areas "1", "8" and "7" of the image IMG_A, a third padding region connected with the top side S_T of the image IMG_A (e.g., at least a portion of the padding region PR_T) is generated by duplicating the image areas "1"-"3" of the image IMG_A to obtain a duplicated partial region and then rotating the duplicated partial region by 180°, and a fourth padding region connected with the bottom side S_B of the image IMG_A (e.g., at least a portion of the padding region PR_B) is generated by duplicating the image areas "5"-"7" of the image IMG_A to obtain a duplicated partial region and then rotating the duplicated partial region by 180°.

To make a shape of the viewport-based pyramid projection layout 400 become a rectangle, a top-left corner padding region is generated by duplicating the image area "1" to obtain a duplicated padding region and then rotating the duplicated padding region by 180°, a top-right corner padding region is generated by duplicating the image area "3" to obtain a duplicated padding region and then rotating the duplicated padding region by 180°, a bottom-left corner padding region is generated by duplicating the image area "7" to obtain a duplicated padding region and then rotating the duplicated padding region by 180°, and a bottom-right corner padding region is generated by duplicating the image area "5" to obtain a duplicated padding region and then rotating the duplicated padding region by 180°.

As mentioned above, the decoding circuit 122 receives the bitstream BS from the transmission means 103 (e.g., a wired/wireless communication link or a storage medium), and performs a video decoder function for decoding a part of the received bitstream BS to generate the decoded frame IMG' that is a decoded projection-based frame having the same 360 VR projection layout L_VR employed by the conversion circuit 114. In a case where the 360 VR projection layout L_VR is set by a pyramid projection layout with boundary padding (e.g., viewport-based pyramid projection layout 400 shown in FIG. 4), the decoded frame IMG' has padding regions located at boundaries of the pyramid projection layout. In one embodiment, the decoding circuit 122 may crop the padding regions, such that only the original region (e.g., the image IMG_A shown in FIG. 5) is reconstructed. In an alternative design, the decoding circuit 122 may be modified to blend a padding region with corresponding pixels in the original region (e.g., the image IMG_A shown in FIG. 5) when reconstructing the original region (e.g., the image IMG_A shown in FIG. 5).

Figure 6:
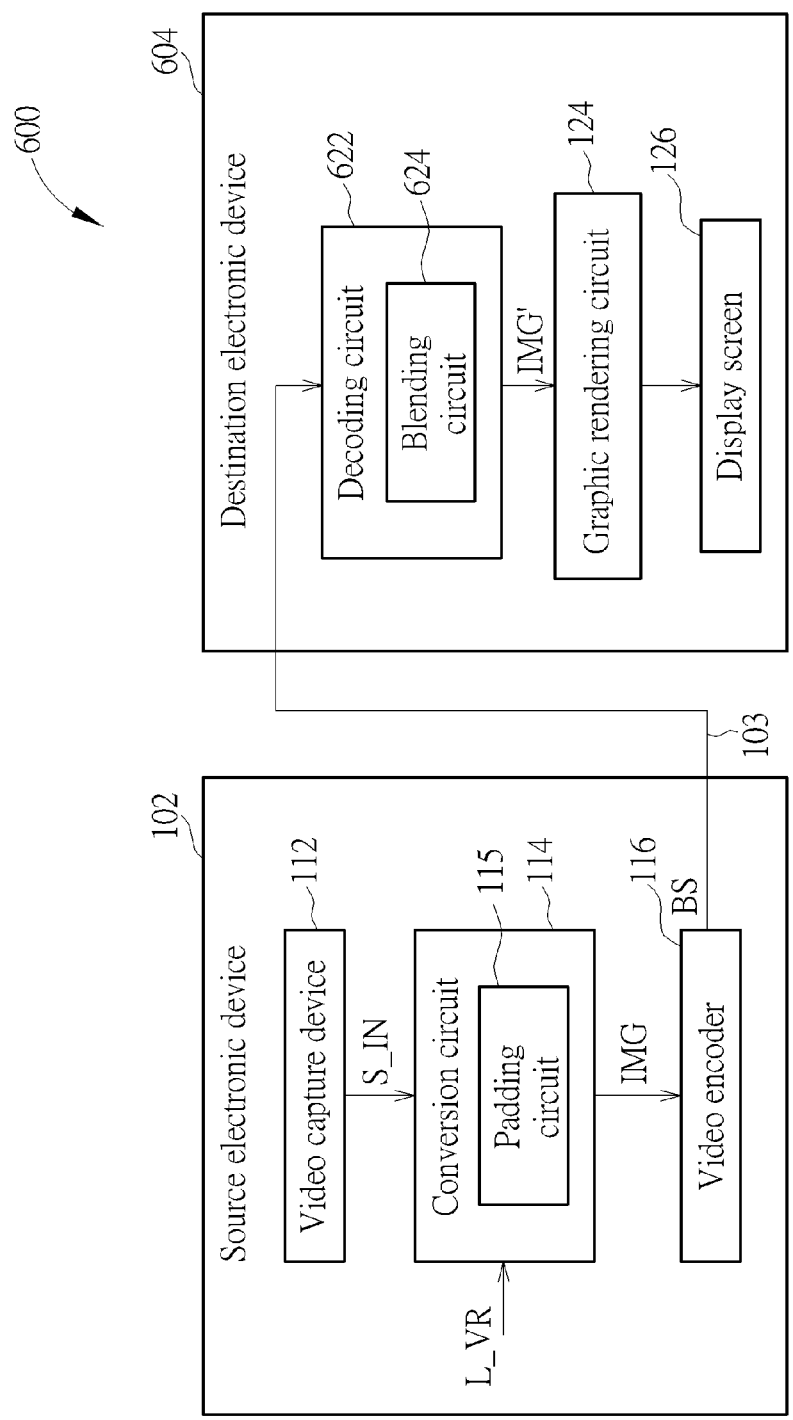
FIG. 6 is a diagram illustrating a second 360 VR system according to an embodiment of the present invention.

FIG. 6 is a diagram illustrating a second 360 VR system according to an embodiment of the present invention. The major difference between the 360 VR systems 100 and 600 is that a decoding circuit 622 of a destination electronic device 604 has a blending circuit 624 arranged to perform blending after coding. The decoding circuit 622 is arranged to decode a part of the bitstream BS to generate a decoded frame (i.e., a decoded projection-based frame) IMG' with the projection faces (e.g., base projection face FR and lateral projection faces U', B', L', R' shown in FIG. 4) and the padding regions (e.g., padding regions PR_T, PR_B, PR_L, PR_R shown in FIG. 4) packed in the 360 VR projection layout L_VR (e.g., viewport-based pyramid projection layout 400 shown in FIG. 4). During the decoding process of generating the decoded frame IMG', the decoding circuit 622 reconstructs a first pixel in a projection face (e.g., one of base projection face FR and lateral projection faces U', B', L', R') by using the blending circuit 624 to blend a decoded pixel value of the first pixel and a decoded pixel value of a second pixel included in a padding region (e.g., one of padding regions PR_T, PR_B, PR_L, PR_R). For example, a pixel value of the second pixel included in the padding region packed in the projection-based frame IMG is generated by duplicating a pixel value of the first pixel included in the projection face packed in the projection-based frame IMG. In one embodiment, a distance-based weighting scheme can be adopted by the blending circuit 624.

Figure 7:
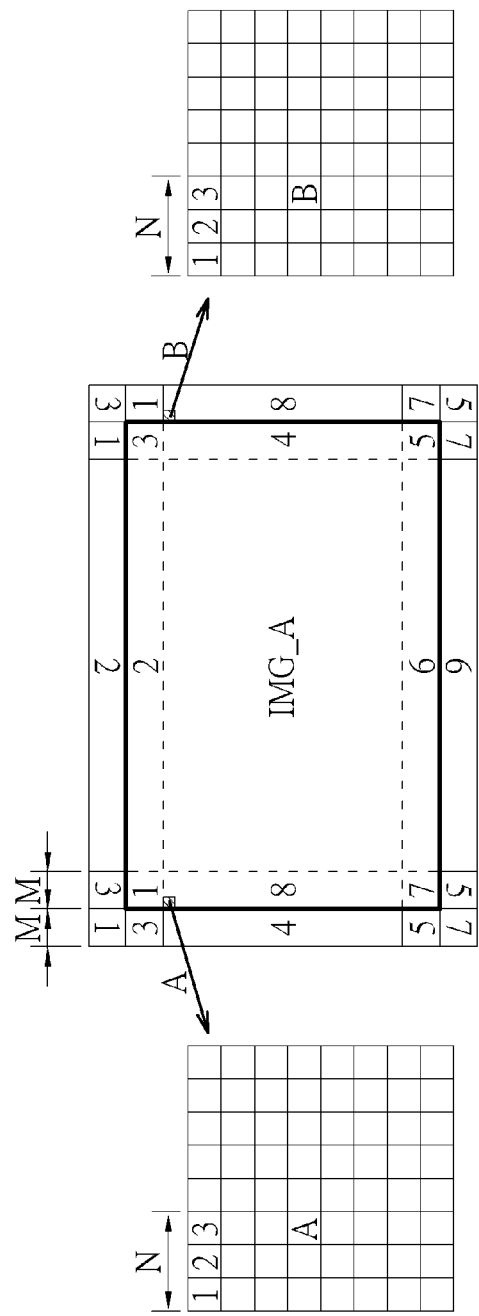
FIG. 7 is a diagram illustrating a horizontal blending operation according to an embodiment of the present invention.

FIG. 7 is a diagram illustrating a horizontal blending operation according to an embodiment of the present invention. Suppose that the padding regions PR_T, PR_B, PR_L, PR_R shown in FIG. 4 are generated based on pixel duplication, as illustrated in FIG. 5. Hence, at an encoder side (e.g., source electronic device 102 shown in FIG. 6), one padding region connected with the left side of the image IMG_A (e.g., at least a portion of the padding region PR_L shown in FIG. 4) is generated by duplicating the image areas "3"-"5" of the image IMG_A, and another padding region connected with the right side of the image IMG_A (e.g., at least a portion of the padding region PR_R shown in FIG. 4) is generated by duplicating the image areas "1", "8" and "7" of the image IMG_A. Specifically, at an encoder side (e.g., source electronic device 102 shown in FIG. 6), a 8×8 block located at a top-left corner of the image area "8" included in the original region is duplicated to set a 8×8 block located at a top-left corner of the image area "8" included in a right padding region. Hence, at a decoder side (e.g., destination electronic device 604 shown in FIG. 6), decoded pixels in the 8×8 block located at the top-left corner of the image area "8" included in the original region (i.e., image IMG_A) can be blended with decoded pixels in the 8×8 block located at the top-left corner of the image area "8" included in the right padding region. A reconstructed pixel value of a pixel "A" shown in FIG. 7 can be computed using horizontal distance-based weighting expressed as below.

$$A_{REC} = \frac{(M-N)*B + (M+N)*A + M}{2*M} \quad (1)$$

In above formula (1), $A_{REC}$ represents a reconstructed pixel value of a first pixel (e.g., pixel "A" shown in FIG. 7), A represents the decoded pixel value of the first pixel, B represents the decoded pixel value of a second pixel (e.g., pixel "B" shown in FIG. 7), M represents a padding/blending width, and N represents a distance between the first pixel and a boundary of the associated projection face that connects with an adjacent padding region. As shown in FIG. 7, the horizontal distance N is indicated by pixels labeled by "1"-"3" in the 8×8 block. In this example, M=8 and N=3 for horizontal blending.

Figure 8:
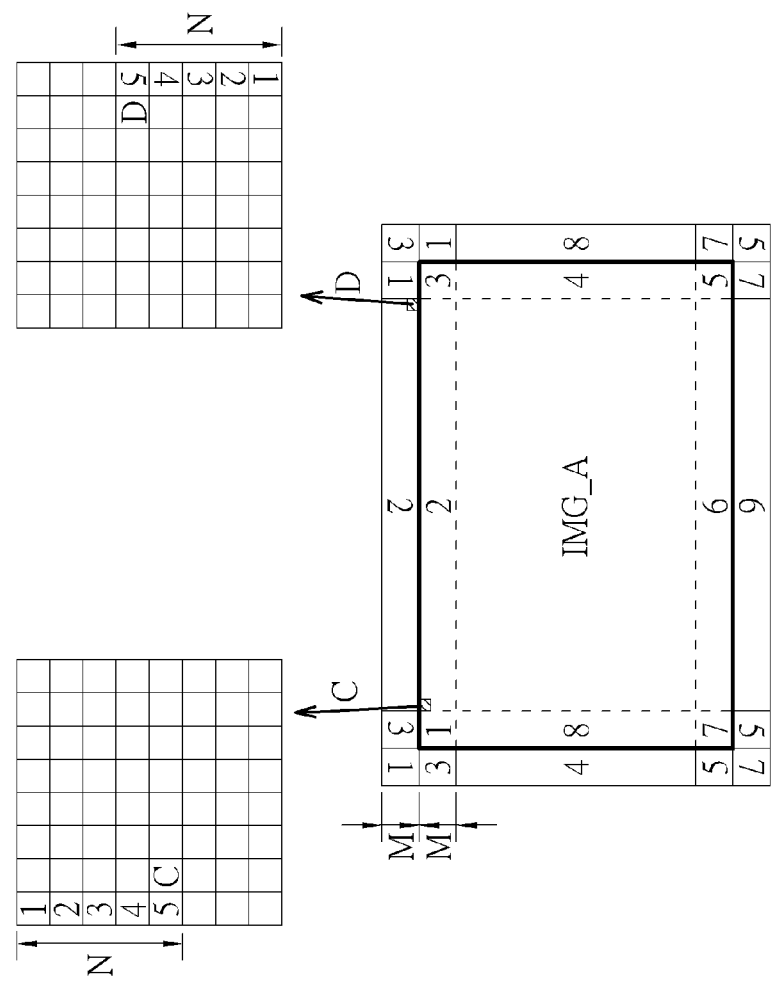
FIG. 8 is a diagram illustrating a vertical blending operation according to an embodiment of the present invention.

FIG. 8 is a diagram illustrating a vertical blending operation according to an embodiment of the present invention. Suppose that the padding regions PR_T, PR_B, PR_L, PR_R shown in FIG. 4 are generated based on pixel duplication, as illustrated in FIG. 5. Hence, at an encoder side (e.g., source electronic device 102 shown in FIG. 6), one padding region connected with the top side S_T of the image IMG_A (e.g., at least a portion of the padding region PR_T) is generated by duplicating the image areas "1"-"3" of the image IMG_A to obtain a duplicated partial region and then rotating the duplicated partial region by 180°, and another padding region connected with the bottom side S_B of the image IMG_A (e.g., at least a portion of the padding region PR_B) is generated by duplicating the image areas "5"-"7" of the image IMG_A to obtain a duplicated partial region and then rotating the duplicated partial region by 180°. Specifically, at an encoder side (e.g., source electronic device 102 shown in FIG. 6), a 8×8 block located at a top-left corner of the image area "2" included in the original region (i.e., image IMG_A) is duplicated to set a 8×8 block located at a bottom-right corner of the 180°-rotated image area "2" included in a top padding region. Hence, at a decoder side (e.g., destination electronic device 604 shown in FIG. 6), decoded pixels in the 8×8 block located at the top-left corner of the image area "2" included in the original region (i.e., image IMG_A) can be blended with decoded pixels in the 8×8 block located at the bottom-right corner of the 180°-rotated image area "2" included in the top padding region. A reconstructed pixel value of a pixel "C" shown in FIG. 8 can be computed using vertical distance-based weighting expressed as below.

$$C_{REC} = \frac{(M-N)*D + (M+N)*C + M}{2*M} \quad (2)$$

In above formula (2), $C_{REC}$ represents a reconstructed pixel value of a first pixel (e.g., pixel "C" shown in FIG. 7), C represents the decoded pixel value of the first pixel, D represents the decoded pixel value of a second pixel (e.g., pixel "D" shown in FIG. 7), M represents a padding/blending width, and N represents a distance between the first pixel and a boundary of the associated projection face that connects with an adjacent padding region. As shown in FIG. 7, the vertical distance N is indicated by pixels labeled by "1"-"5" in the 8×8 block. In this example, M=8 and N=5 for vertical blending.

For certain applications, a conversion circuit may be implemented in a destination electronic device to convert a decoded frame with a first 360 VR projection layout into a converted frame with a second 360 VR projection layout that is different from the first 360 VR projection layout. For example, the decoded frame generated from a decoding circuit may be a projection-based frame with projection faces packed in a pyramid projection layout, and the converted frame generated from the conversion circuit and used by a graphic rendering circuit may be a projection-based frame with projection faces packed in an equirectangular projection (ERP) layout.

A pixel located at an integer position (i.e., (x, y), where x and y are integer positions) in the converted frame may be mapped to a pixel located at a non-integer position (i.e., (x', y'), where x' is not an integer position and/or y' is not an integer position) in the decoded frame. That is, when performing projection layout conversion, the conversion circuit may set a pixel located at an integer position in the converted frame by a pixel located at a non-integer position in the decoded frame. Since a pixel value of a pixel located at a non-integer position is not directly available in the decoded frame, the conversion circuit may determine the pixel value of the pixel located at the non-integer position in the decoded frame by using an interpolation filter to process pixels located at integer positions in the decoded frame. In a case where the pixel with the non-integer position is at or near an edge between a first projection face and a second projection face packed in the decoded frame, the pixels used by the interpolation filter may include at least one pixel selected from the first projection face and at least one pixel selected from the second projection face. If the first projection face and the second projection face in the first 360 VR projection layout are continuous faces with image content continuity at an edge between the first projection face and the second projection face, an object across the edge between the first projection face and the second projection face may be severely distorted due to the employed 360 VR projection. As a result, the pixels used by the interpolation filter may belong to different objects, thus resulting in artifacts in the converted frame.

Figure 9:
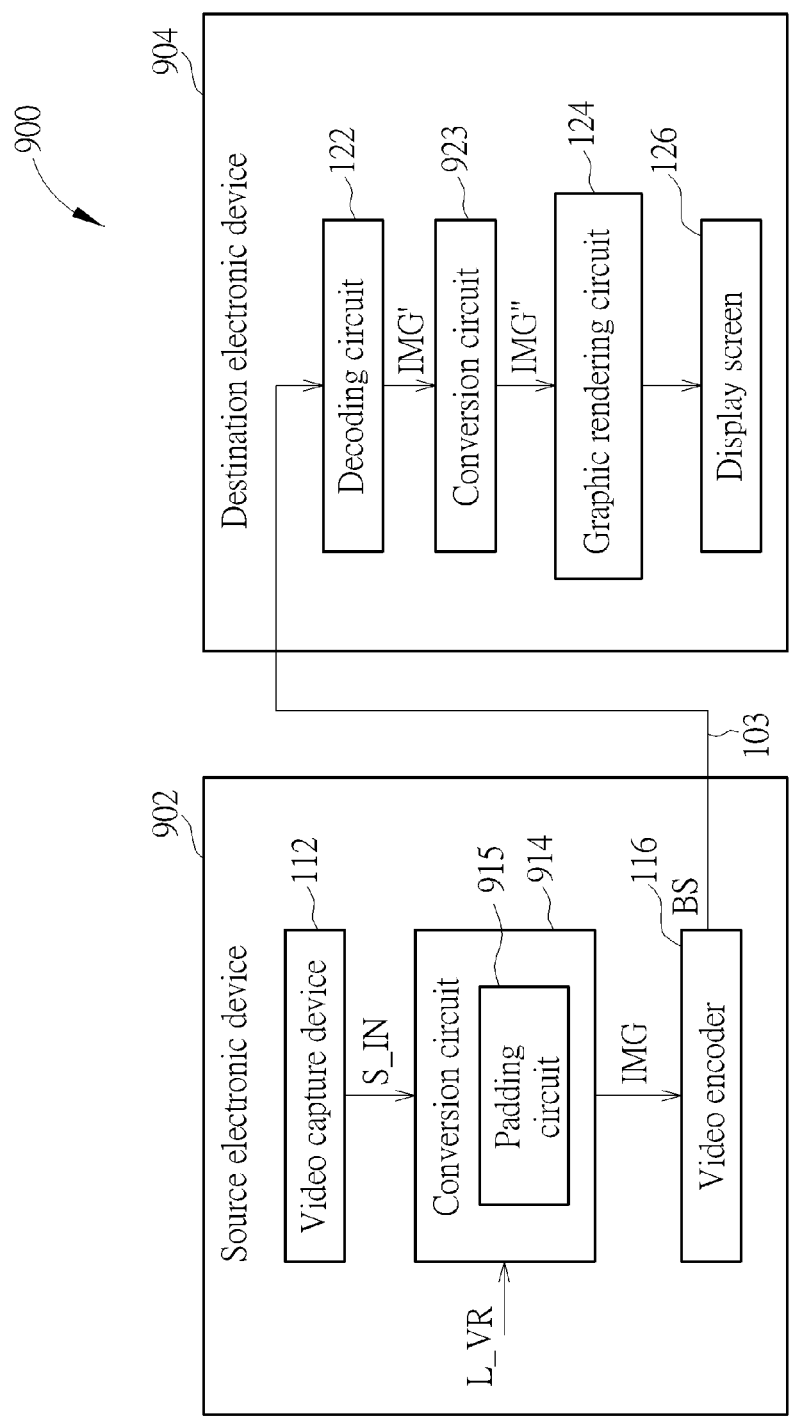
FIG. 9 is a diagram illustrating a third 360 VR system according to an embodiment of the present invention.

To address the above issue, the present invention proposes an innovative projection layout design with edge padding between continuous projection faces for reducing artifacts introduced by interpolation that is used for projection layout conversion. FIG. 9 is a diagram illustrating a third 360 VR system according to an embodiment of the present invention. A conversion circuit 923 is included in a destination electronic device 904 to convert a decoded frame IMG' with one 360 VR projection layout into a converted frame IMG" with a different 360 VR projection layout. For example, the decoded frame IMG' may be a projection-based frame with projection faces packed in a pyramid projection layout, and the converted frame IMG" may be a projection-based frame with projection faces packed in an equirectangular projection (ERP) layout. The conversion circuit 914 in a source electronic device 902 is sued to generate a projection-based frame IMG with a 360 VR projection layout L_VR according to the omnidirectional image/video content S_IN. It should be noted that the decoded frame IMG' is a decoded projection-based frame with the same 360 VR projection layout L_VR employed by the conversion circuit 914. In this embodiment, the 360 VR projection layout L_VR is set by an innovative projection layout with edge padding between continuous projection faces. Specifically, a padding circuit 915 is included in the conversion circuit 914, and is arranged to create and insert one padding region between continuous projection faces for reducing artifacts caused by wrong interpolation taps.

Figure 10:
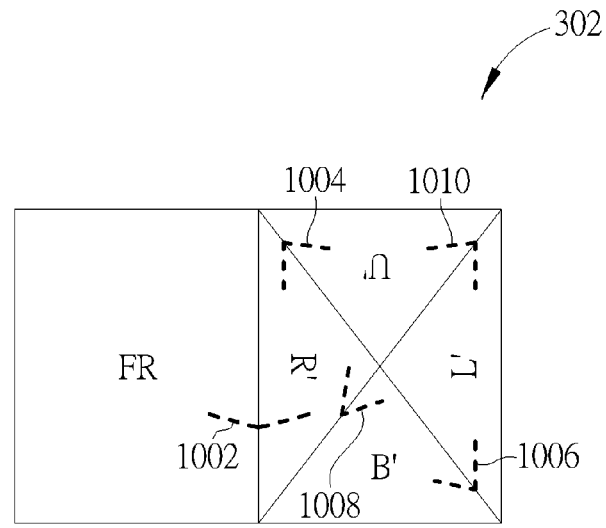
FIG. 10 is a diagram illustrating a plurality of objects each across an edge between two continuous projection faces packed in the viewport-based pyramid projection layout shown in FIG. 3.

Please refer to FIG. 3 in conjunction with FIG. 10. FIG. 10 is a diagram illustrating a plurality of objects each across an edge between two continuous projection faces packed in the viewport-based pyramid projection layout 302 shown in FIG. 3. Concerning the viewport-based pyramid projection layout 302 shown in FIG. 3, an image content continuity edge exists between the hypotenuse S51 of the lateral projection face R' and the side S14 of the base projection face FR, an image content continuity edge exists between the cathetus S52 of the lateral projection face R' and the cathetus S23 of the lateral projection face U', an image content continuity edge exists between the cathetus S53 of the lateral projection face R' and the cathetus S42 of the lateral projection face B', an image content continuity edge exists between the cathetus S33 of the lateral projection face L' and the cathetus S22 of the lateral projection face U', and an image content continuity edge exists between the cathetus S32 of the lateral projection face L' and the cathetus S43 of the lateral projection face B'. Assume that each of the objects 1002, 1004, 1006, 1008, 1010 has a straight shape when captured by the video capture device 112. Due to inherent characteristics of the pyramid projection, the object 1002 is bent at the image content continuity edge between the lateral projection face R' and the base projection face FR, the object 1004 is bent at the image content continuity edge between the lateral projection faces R' and U', the object 1006 is bent at the image content continuity edge between the lateral projection faces B' and L', the object 1008 is bent at the image content continuity edge between the lateral projection face B' and R', and the object 1010 is bent at the image content continuity edge between the lateral projection faces L' and U'. When converting a decoded frame with the viewport-based pyramid projection layout 302 into a converted frame with a different projection layout, vertical/horizontal interpolation performed around any of the image content continuity edges may introduce artifacts to the converted frame due to wrong interpolation taps set by adjacent pixels located along a vertical/horizontal direction.

To efficiently reduce the artifacts, padding can be introduced on a projection layout around each image content continuity edge between continuous projection faces, and can be used by interpolation for projection format conversion. For example, an omnidirectional image/video content is mapped onto projection faces via a 360-VR projection, where the projection faces include a first projection face and a second projection face, and there is an image content continuity edge between a first side of the first projection face and a first side of the second projection face if the first side of the first projection face connects with the first side of the second projection face. The padding circuit 915 generates at least one padding region, where the at least one padding region includes a first padding region. The conversion circuit 914 combines the projection faces and the at least one padding region, where the first padding region connects with the first side of the first projection face and the first side of the second projection face for isolating the first side of the first projection face from the first side of the second projection face.

Figure 11:
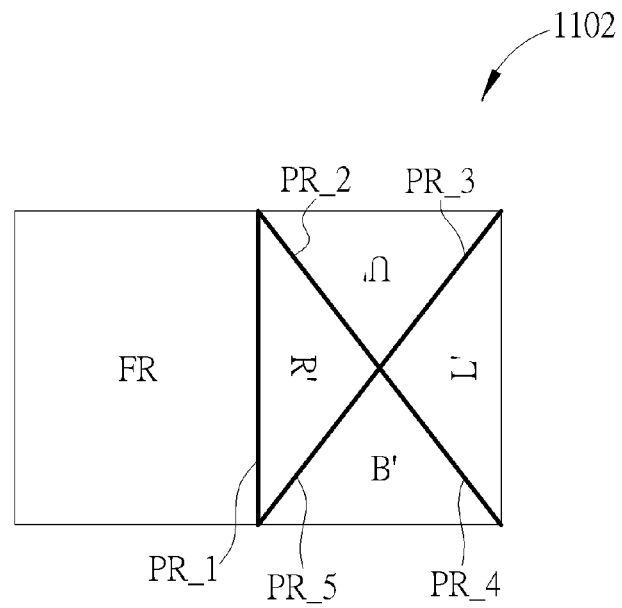
FIG. 11 is a diagram illustrating a viewport-based pyramid projection layout with edge padding between continuous projection faces according to an embodiment of the present invention.

FIG. 11 is a diagram illustrating a viewport-based pyramid projection layout with edge padding between continuous projection faces according to an embodiment of the present invention. For example, the 360 VR projection layout L_VR used by the conversion circuit 914 may be set by the proposed pyramid projection layout 1102 shown in FIG. 11. The padding circuit 915 adds a padding region PR_1 to the image content continuity edge between the lateral projection face R' and the base projection face FR, adds a padding region PR_2 to the image content continuity edge between the lateral projection faces R' and U', adds a padding region PR_3 to the image content continuity edge between the lateral projection faces U' and L', adds a padding region PR_4 to the image content continuity edge between the lateral projection face B' and L', and adds a padding region PR_5 to the image content continuity edge between the lateral projection faces B' and R' In a first exemplary edge padding design, the padding circuit 915 applies geometry padding to the base projection face FR and the lateral projection face R' to determine pixel values of pixels included in the padding region PR_1, applies geometry padding to the lateral projection faces R' and U' to determine pixel values of pixels included in the padding region PR_2, applies geometry padding to the lateral projection faces U' and L' to determine pixel values of pixels included in the padding region PR_3, applies geometry padding to the lateral projection faces L' and B' to determine pixel values of pixels included in the padding region PR_4, and applies geometry padding to the lateral projection faces B' and R' to determine pixel values of pixels included in the padding region PR_5.

Hence, the padding region PR_1 includes one geometry mapping region extended from one side of the base projection face FR and another geometry mapping region extended from one side of the lateral projection face R'; the padding region PR_2 includes one geometry mapping region extended from one side of the lateral projection face R' and another geometry mapping region extended from one side of the lateral projection face U'; the padding region PR_3 includes one geometry mapping region extended from one side of the lateral projection face U' and another geometry mapping region extended from one side of the lateral projection face L'; the padding region PR_4 includes one geometry mapping region extended from one side of the lateral projection face L' and another geometry mapping region extended from one side of the lateral projection face B'; and the padding region PR_5 includes one geometry mapping region extended from one side of the lateral projection face B' and another geometry mapping region extended from one side of the lateral projection face R'. As mentioned above, a geometry mapping region extended from one side of a projection face is obtained by mapping the content of a region on a sphere (e.g., sphere 202 shown in FIG. 2) onto the geometry mapping region, where the region on the sphere is adjacent to a region from which the projection face is obtained.

In a second exemplary edge padding design, the padding circuit 915 sets pixel values of pixels included in the padding region PR_1 by duplicating pixel values of pixels included in the base projection face FR and pixel values of pixels included in the lateral projection face R', sets pixel values of pixels included in the padding region PR_2 by duplicating pixel values of pixels included in the lateral projection face R' and pixel values of pixels included in the lateral projection face U', sets pixel values of pixels included in the padding region PR_3 by duplicating pixel values of pixels included in the lateral projection face U' and pixel values of pixels included in the lateral projection face L', sets pixel values of pixels included in the padding region PR_4 by duplicating pixel values of pixels included in the lateral projection face L' and pixel values of pixels included in the lateral projection face B', and sets pixel values of pixels included in the padding region PR_5 by duplicating pixel values of pixels included in the lateral projection face B' and pixel values of pixels included in the lateral projection face R'.

Hence, the padding region PR_1 includes one duplication region extended from one side of the base projection face FR and another duplication region extended from one side of the lateral projection face R'; the padding region PR_2 includes one duplication region extended from one side of the lateral projection face R' and another duplication region extended from one side of the lateral projection face U'; the padding region PR_3 includes one duplication region extended from one side of the lateral projection face U' and another duplication region extended from one side of the lateral projection face L'; the padding region PR_4 includes one duplication region extended from one side of the lateral projection face L' and another duplication region extended from one side of the lateral projection face B'; and the padding region PR_5 includes one duplication region extended from one side of the lateral projection face B' and another duplication region extended from one side of the lateral projection face R'.

As mentioned above, padding can be introduced on a projection layout around each image content continuity edge between continuous projection faces, and can be used by interpolation for projection format conversion. It should be noted that the viewport-based pyramid projection layout 1102 shown in FIG. 11 is merely one example. In practice, the same concept of adding padding to image content continuity edge between continuous projection faces can be applied to other projection layouts, including cube-based projection layouts, triangle-based projection layouts, equatorial cylindrical projection layout, etc.

Figure 12:
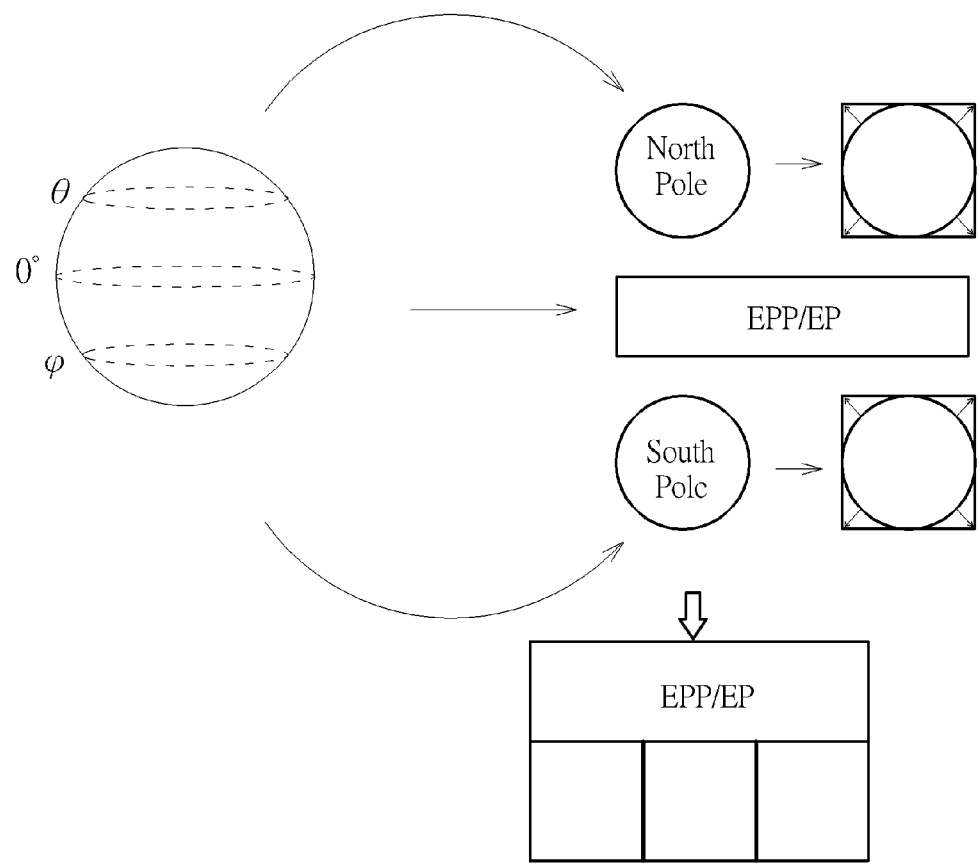
FIG. 12 is a diagram illustrating an equatorial cylindrical projection layout with edge padding between continuous projection faces according to an embodiment of the present invention.
Figure 13:
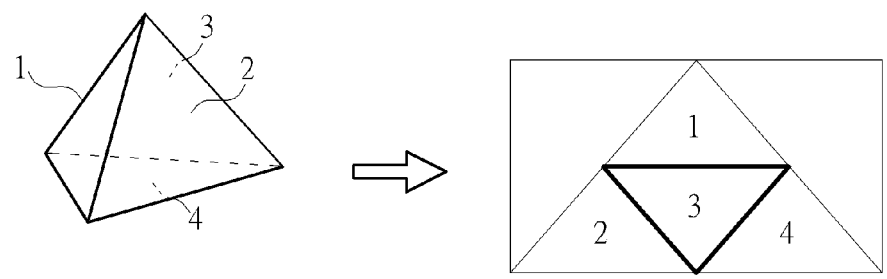
FIG. 13 is a diagram illustrating a tetrahedron projection layout with edge padding between continuous projection faces according to an embodiment of the present invention.
Figure 14:
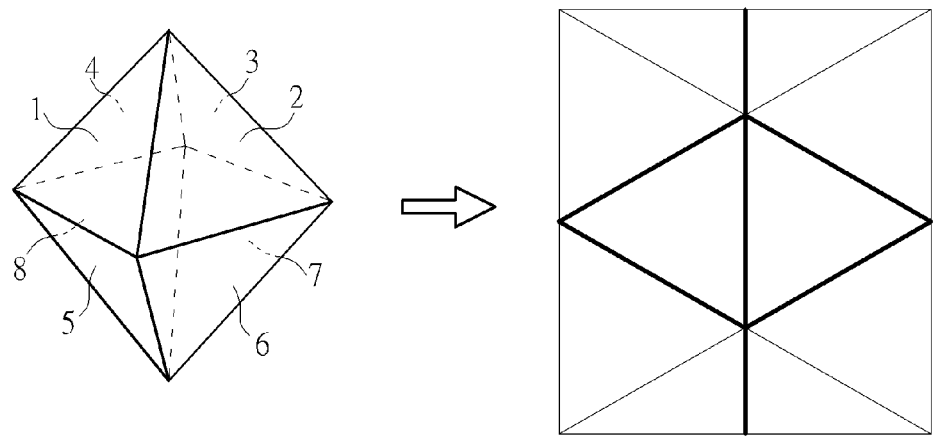
FIG. 14 is a diagram illustrating an octahedron projection layout with edge padding between continuous projection faces according to an embodiment of the present invention.
Figure 15:
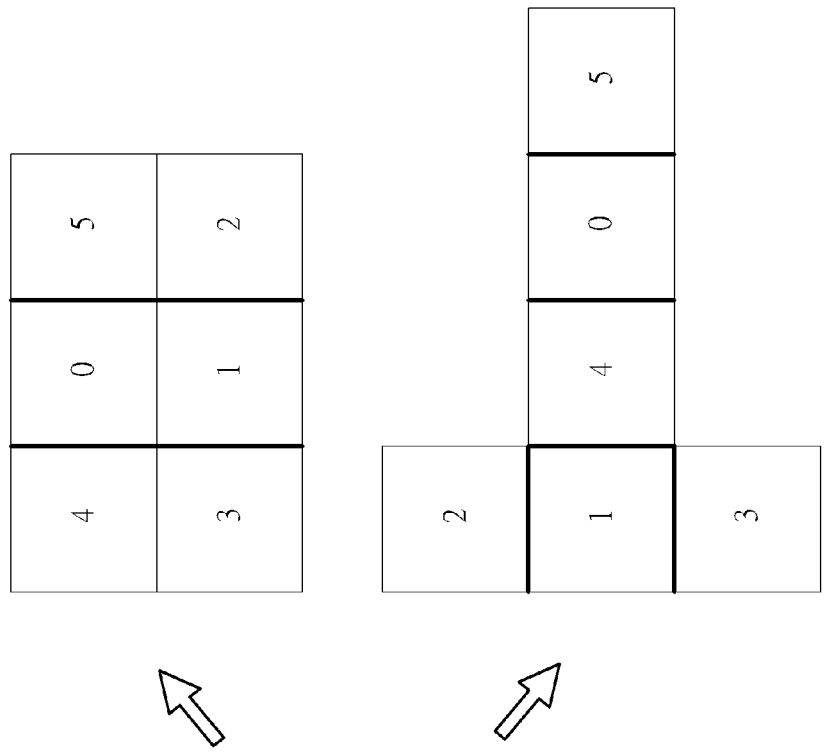
FIG. 15 is a diagram illustrating cubemap projection layouts with edge padding between continuous projection faces according to an embodiment of the present invention.
Figure 15:
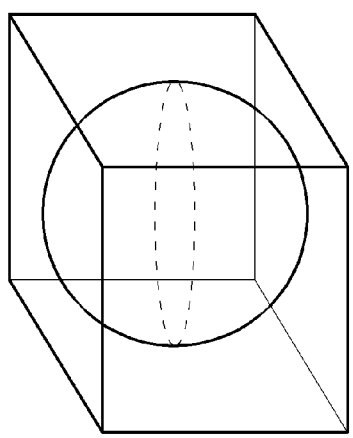
Figure 16:
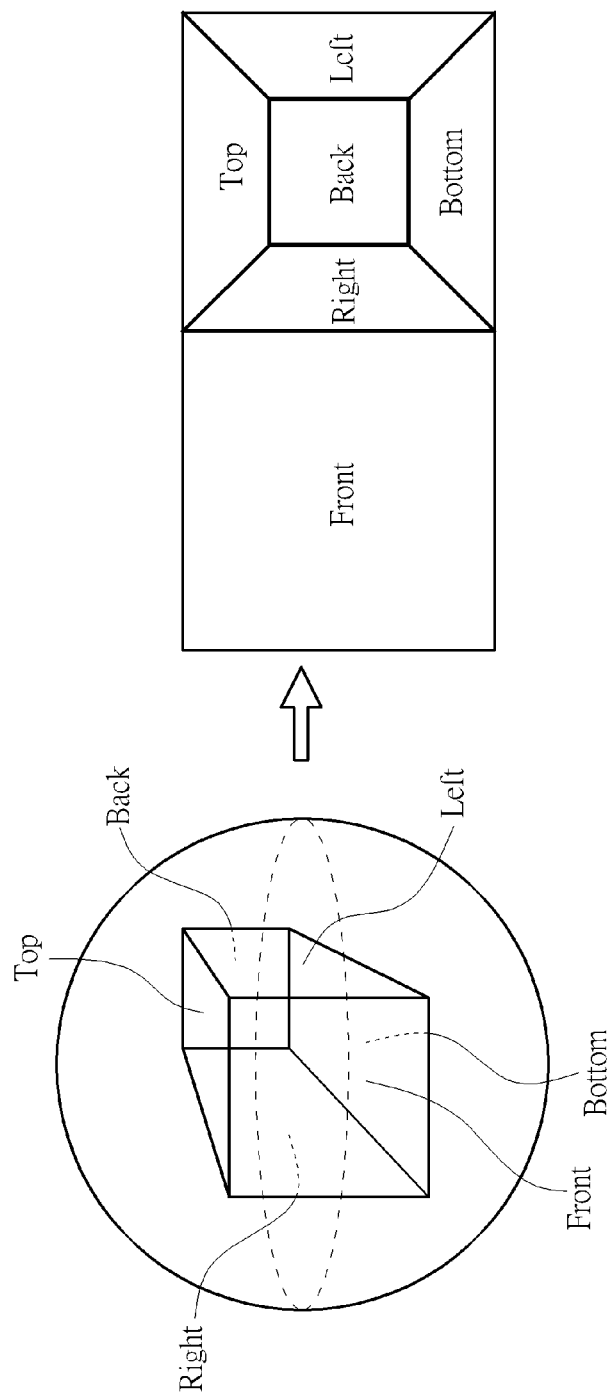
FIG. 16 is a diagram illustrating a truncated square pyramid projection layout with edge padding between continuous projection faces according to an embodiment of the present invention.
Figure 17:
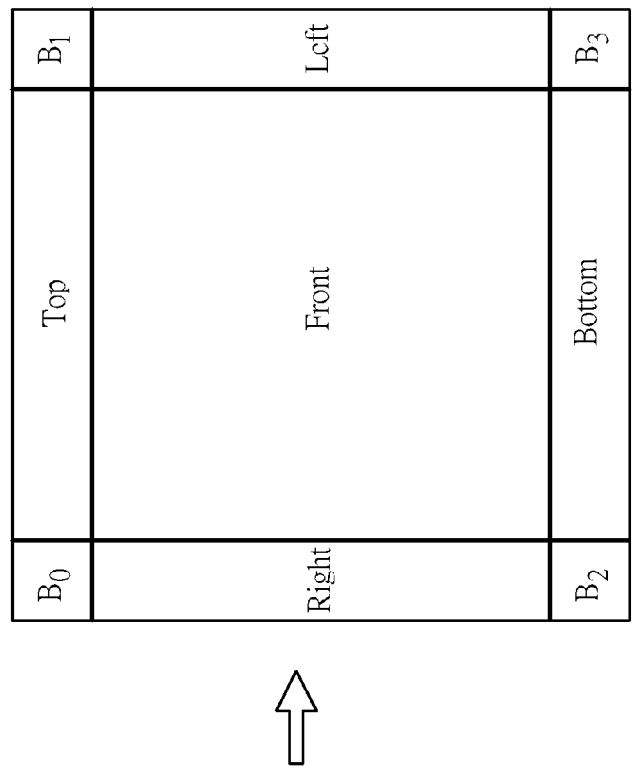
FIG. 17 is a diagram illustrating a viewport-based cube projection layout with edge padding between continuous projection faces according to an embodiment of the present invention.
Figure 17:
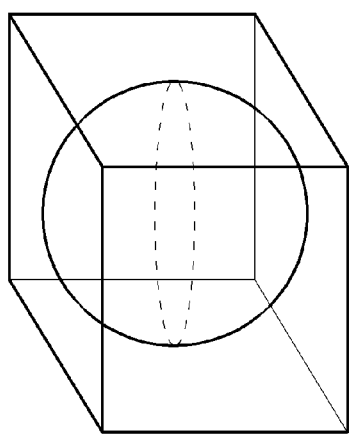

FIG. 12 is a diagram illustrating an equatorial cylindrical projection layout with edge padding between continuous projection faces according to an embodiment of the present invention. FIG. 13 is a diagram illustrating a tetrahedron projection layout with edge padding between continuous projection faces according to an embodiment of the present invention. FIG. 14 is a diagram illustrating an octahedron projection layout with edge padding between continuous projection faces according to an embodiment of the present invention. FIG. 15 is a diagram illustrating cubemap projection layouts with edge padding between continuous projection faces according to an embodiment of the present invention. FIG. 16 is a diagram illustrating a truncated square pyramid projection layout with edge padding between continuous projection faces according to an embodiment of the present invention. FIG. 17 is a diagram illustrating a viewport-based cube projection layout with edge padding between continuous projection faces according to an embodiment of the present invention. The edge padding regions in the proposed projection layouts shown in FIGS. 12-17 are represented by thick lines.

There is an image content continuity edge between a first side of a first projection face and a first side of a second projection face if the first side of the first projection face connects with the first side of the second projection face. However, objects across continuous projection faces in a projection layout may encounter severe distortion. As a result, interpolation used by projection format conversion may introduce artifacts due to wrong interpolation taps. As mentioned above, geometry mapping may be used to create a padding region that connects with the first side of the first projection face and the first side of the second projection face to isolate the first side of the first projection face from the first side of the second projection face. The padding region includes a first geometry mapping region extended from the first side of the first projection face and a second geometry mapping region extended from the first side of the second projection face. A geometry mapping region extended from one side of a projection face is obtained by mapping the content of a region on a sphere (e.g., sphere 202 shown in FIG. 2) onto the geometry mapping region, where the region on the sphere is adjacent to a region from which the projection face is obtained. If the first geometry mapping region connects with the second geometry mapping region, an image content discontinuity edge occurs between the first geometry mapping region and the second geometry mapping region of the padding region, and may have an impact on the coding efficiency. To mitigate the coding efficiency degradation caused by edge padding generated from geometry mapping, a blending region may be created and inserted between the first geometry mapping region and the second geometry mapping region in the padding region.

Figure 18:
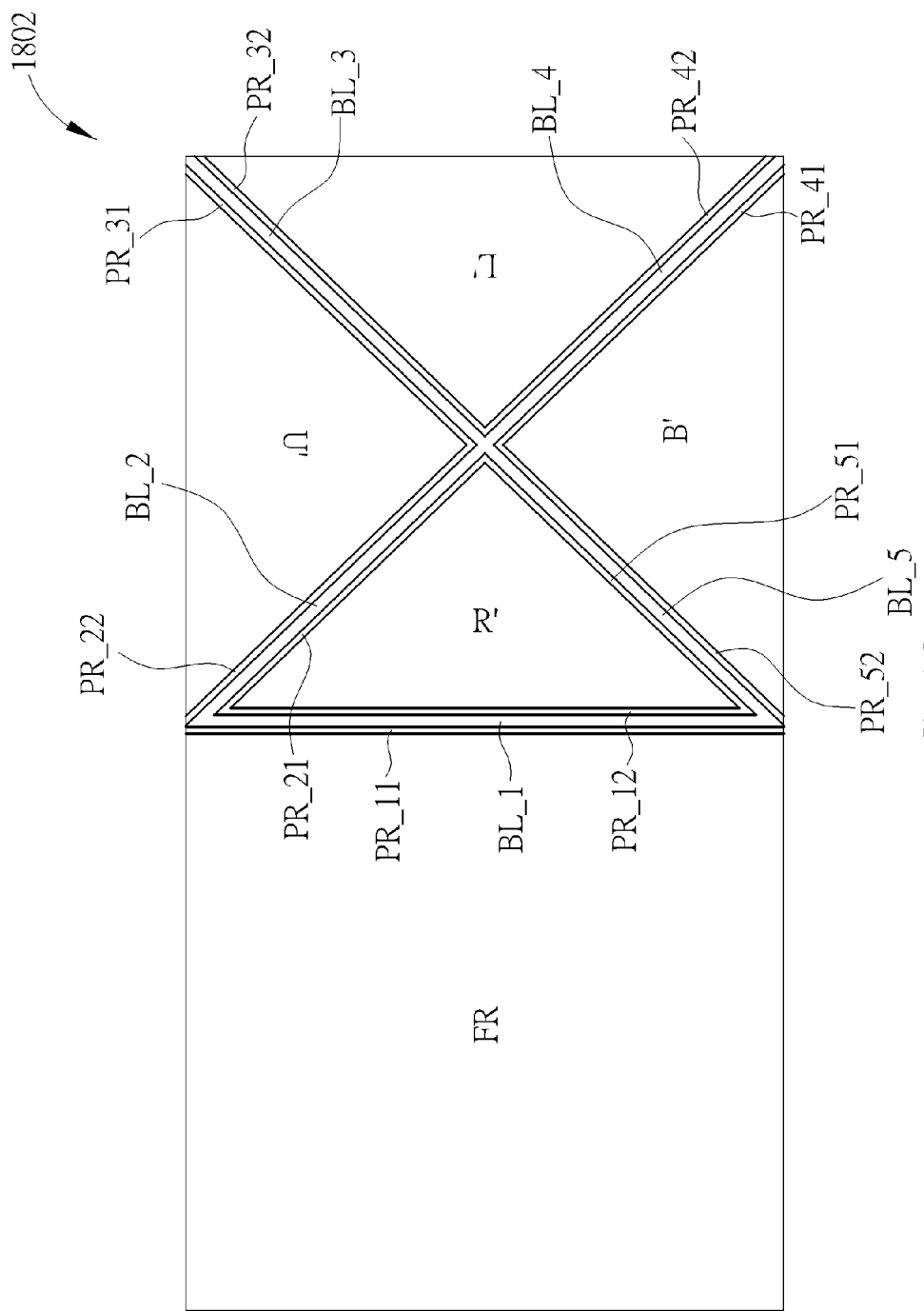
FIG. 18 is a diagram illustrating another viewport-based pyramid projection layout with edge padding between continuous projection faces according to an embodiment of the present invention.

FIG. 18 is a diagram illustrating another viewport-based pyramid projection layout with edge padding between continuous projection faces according to an embodiment of the present invention. Like the viewport-based pyramid projection layouts 1102 shown in FIG. 11, the viewport-based pyramid projection layout 1802 includes a padding region inserted between the base projection face FR and the lateral projection face R', a padding region inserted between lateral projection faces R' and U', a padding region inserted between lateral projection faces U' and L', a padding region inserted between lateral projection faces L' and B', and a padding region inserted between lateral projection faces B' and R'. In this embodiment, the padding region inserted between the base projection face FR and the lateral projection face R' includes one geometry mapping region PR_11 extended from one side of the base projection face FR, another geometry mapping region PR_12 extended from one side of the lateral projection face R', and one blending region BL_1 inserted between the geometry mapping regions PR_11 and PR_12; the padding region inserted between the lateral projection faces R' and U' includes one geometry mapping region PR_21 extended from one side of the lateral projection face R', another geometry mapping region PR_22 extended from one side of the lateral projection face U', and one blending region BL_2 inserted between the geometry mapping regions PR_21 and PR_22; the padding region inserted between the lateral projection faces U' and L' includes one geometry mapping region PR_31 extended from one side of the lateral projection face U', another geometry mapping region PR_32 extended from one side of the lateral projection face L', and one blending region BL_3 inserted between the geometry mapping regions PR_31 and PR_32; the padding region inserted between the lateral projection faces B' and L' includes one geometry mapping region PR_41 extended from one side of the lateral projection face B', another geometry mapping region PR_42 extended from one side of the lateral projection face L', and one blending region BL_4 inserted between the geometry mapping regions PR_41 and PR_42; and the padding region inserted between the lateral projection faces R' and B' includes one geometry mapping region PR_51 extended from one side of the lateral projection face R', another geometry mapping region PR_52 extended from one side of the lateral projection face B', and one blending region BL_5 inserted between the geometry mapping regions PR_51 and PR_52.

In one exemplary blending design, a blending region (e.g., BL_1) may be generated by blending (interpolation) performed upon pixels obtained from geometry mapping regions (e.g., PR_11 and PR_12). In another exemplary blending design, a blending region (e.g., BL_1) may be generated by blending a first geometry mapping result of the blending region and a second geometry mapping result of the blending region, where the first geometry mapping result of the blending region is extended from one geometry mapping region (e.g., PR_11), and the second geometry mapping result of the blending region is extended from another geometry mapping region (e.g., PR_12). However, these are for illustrative purposes only, and are not meant to be limitations of the present invention.

As shown in FIG. 9, the padding circuit 915 is included in the conversion circuit 914 at an encoder side (i.e., source electronic device 902). Hence, edge padding is performed before coding. In an alternative design, edge padding may be performed after coding. That is, a padding circuit may be implemented at a decoder side for adding edge padding to a decoded frame that has projection faces packed in a projection layout without edge padding.

Figure 19:
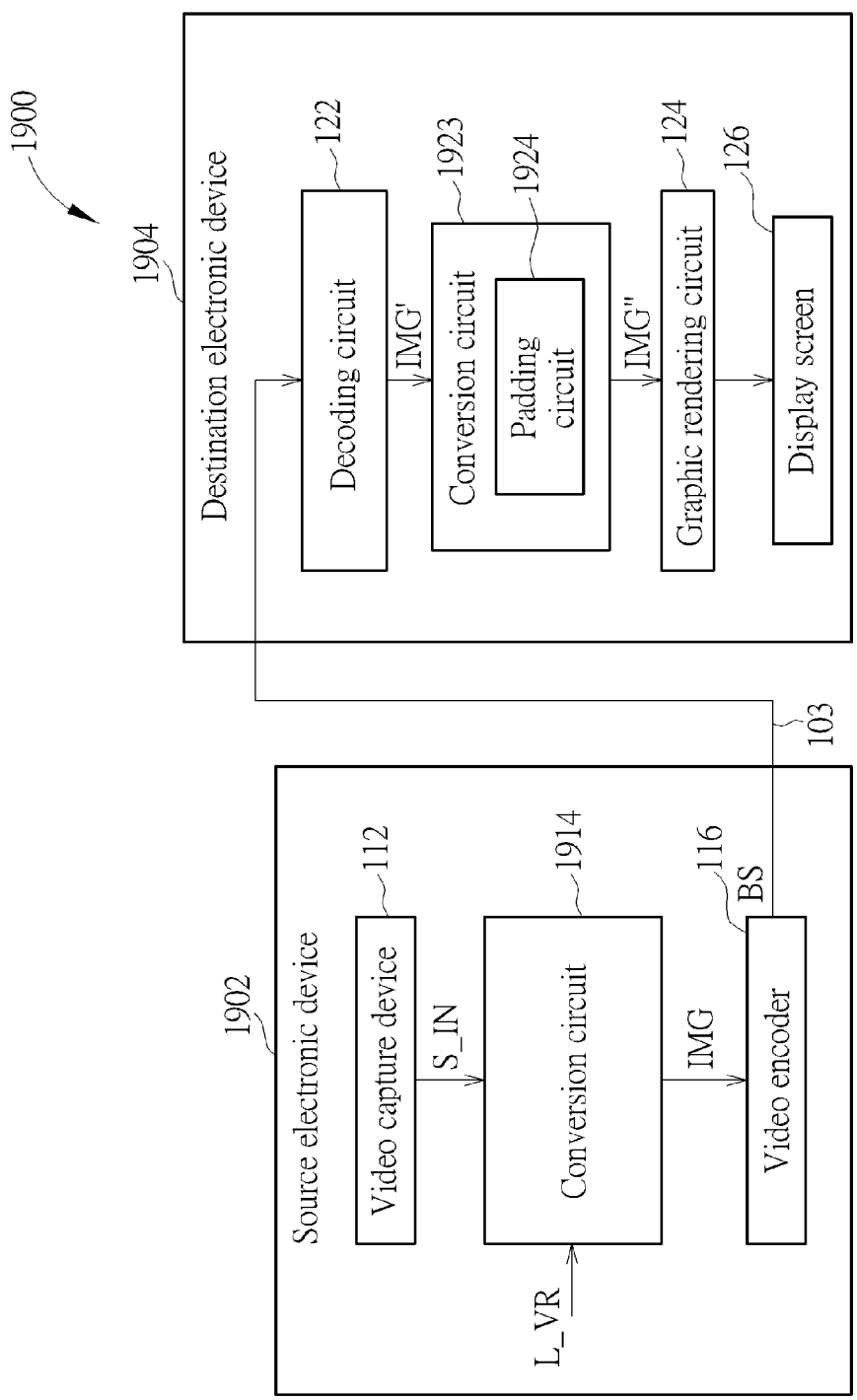
FIG. 19 is a diagram illustrating a fourth 360 VR system according to an embodiment of the present invention.

FIG. 19 is a diagram illustrating a fourth 360 VR system according to an embodiment of the present invention. The major difference between the 360 VR systems 900 and 1900 is that a conversion circuit 1914 at an encoder side (i.e., source electronic device 1902) has no padding circuit used for edge padding, and a conversion circuit 1923 at a decoder side (i.e., destination electronic device 1904) has a padding circuit 1924 used for edge padding. The 360 VR projection layout L_VR employed by the conversion circuit 1914 is set by a projection layout without edge padding. Hence, the decoded frame IMG' generated from the decoding circuit 122 is a projection-based frame having projection faces packed in a projection layout without edge padding. The function and operation of the padding circuit 1924 are identical/similar to that of the padding circuit 915. For example, the padding circuit 1924 generates one padding region that is added to an image content continuity edge between continuous projection faces packed in the decoded frame IMG'. Specifically, projection faces packed in the decoded frame IMG' include a first projection face and a second projection face, where a first side of the first projection face connects with a first side of the second projection face, and there is an image content continuity edge between the first side of the first projection face and the first side of the second projection face. The padding circuit 1924 generates at least one padding region, where the at least one padding region includes a first padding region. The conversion circuit 1923 combines the projection faces in the decoded frame IMG' generated by the decoding circuit 122 and the at least one padding region generated by the padding circuit 1924, where the first padding region connects with the first side of the first projection face and the first side of the second projection face for isolating the first side of the first projection face from the first side of the second projection face. After a frame having a projection layout with edge padding (e.g., one of the projection layouts shown in FIGS. 11-17) is generated, the conversion circuit 1923 converts the frame having the projection layout with edge padding (e.g., a pyramid projection layout with edge padding) into a converted frame IMG" having a different projection layout (e.g., a typical ERP layout without edge padding).

As mentioned above, artifacts may be introduced by wrong interpolation taps due to the fact that an object across an edge between continuous projection faces may be severely distorted by the employed 360 VR projection. To address this issue, one solution is to use a projection layout design with edge padding between continuous projection faces for reducing artifacts introduced by interpolation that is used for projection layout conversion. The present invention further proposes an alternative solution which changes the interpolation direction for achieving the same objective of reducing artifacts introduced by interpolation that is used for projection layout conversion.

Figure 20:
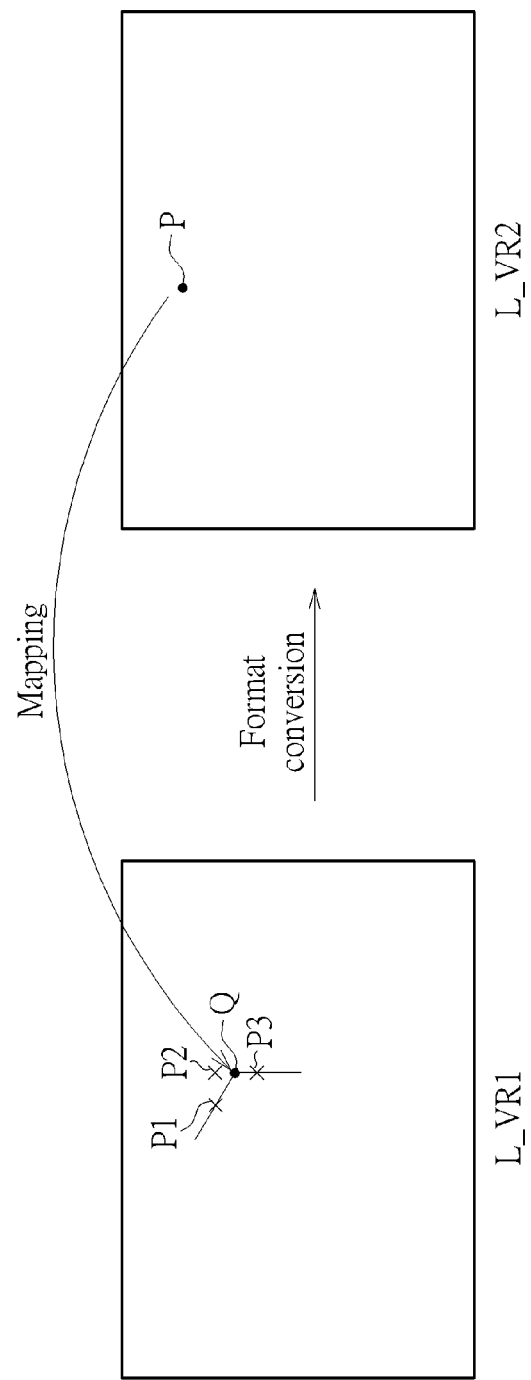
FIG. 20 is a diagram illustrating a projection layout conversion according to an embodiment of the present invention.

FIG. 20 is a diagram illustrating a projection layout conversion according to an embodiment of the present invention. The projection layout conversion performed by the conversion circuit 923/1923 includes a format conversion operation for converting a projection layout L_VR1 of a first 360 VR projection format to a projection layout L_VR2 of a second 360 VR projection format. For example, the projection layout L_VR1 may be a viewport-based pyramid projection layout, and the projection layout L_VR2 may be an ERP layout. As shown in FIG. 20, a pixel P located at an integer position (i.e., (x, y), where x and y are integer positions) in a converted frame IMG" with the projection layout L_VR2 may be mapped to a pixel Q located at a non-integer position (i.e., (x', y'), where x' is not an integer position and/or y' is not an integer position) in a decoded frame with the projection layout L_VR1. That is, the conversion circuit 923/1923 may set the pixel P in the converted frame by the pixel Q in the decoded frame. The conversion circuit 923/1923 may determine a pixel value of the pixel Q located at the non-integer position in the decoded frame by using an interpolation filter to process pixels located at integer positions in the decoded frame.

Assume that the pixel Q with the non-integer position is at or near an edge between a first projection face and a second projection face packed in the decoded frame with the projection layout L_VR1, the pixels used by the interpolation filter may include at least one pixel selected from the first projection face and at least one pixel selected from the second projection face. If the first projection face and the second projection face packed in the first projection layout L_VR1 are continuous faces with image content continuity at the edge between the first projection face and the second projection face, an object across the edge between the first projection face and the second projection face may be severely distorted due to the employed 360 VR projection. For example, pixels P1, P2, and P3 are located at integer positions in the decoded frame with the projection layout L_VR1, where pixels P1 and P3 are located along a projection direction and belong to the same object, and pixels P2 and P3 are located along a straight direction (e.g., vertical direction) and belong to different objects. If the pixel value of the pixel Q is determined by performing vertical interpolation upon pixels (which include P2 and P3) along a vertical direction, an artifact is introduced at the integer position of the pixel P due to wrong interpolation taps. To address this issue, the conversion circuit 923/1923 is arranged to change the interpolation direction, such that the pixel value of the pixel Q is determined by performing interpolation upon pixels (which include P1 and P3) along a projection direction. In this example, the projection direction is not an original interpolation direction being a straight direction.

Projection faces packed in a viewport-based projection layout (e.g., a viewport-based pyramid projection layout, a truncated square pyramid projection layout, or a viewport-based cube projection layout) include a first projection face corresponding to a user's viewport (i.e., a main view) and second projection face(s) corresponding to a non-main view. Taking the viewport-based pyramid projection layout 302 shown in FIG. 3 for example, the base projection face FR corresponds to the main view, and the four lateral projection faces U', B', L', and R' correspond to the non-main view.

Since the user's eyes are most likely attracted by the image content represented in the main-view projection face, the image content represented in the main-view projection face is more important than the image content represented in the non-main-view projection faces. Based on such observation, the present invention proposes applying smooth filtering to at least a portion (i.e., part or all) of the image content represented in the non-main-view projection faces to reduce artifacts and improve the coding efficiency.

Figure 21:
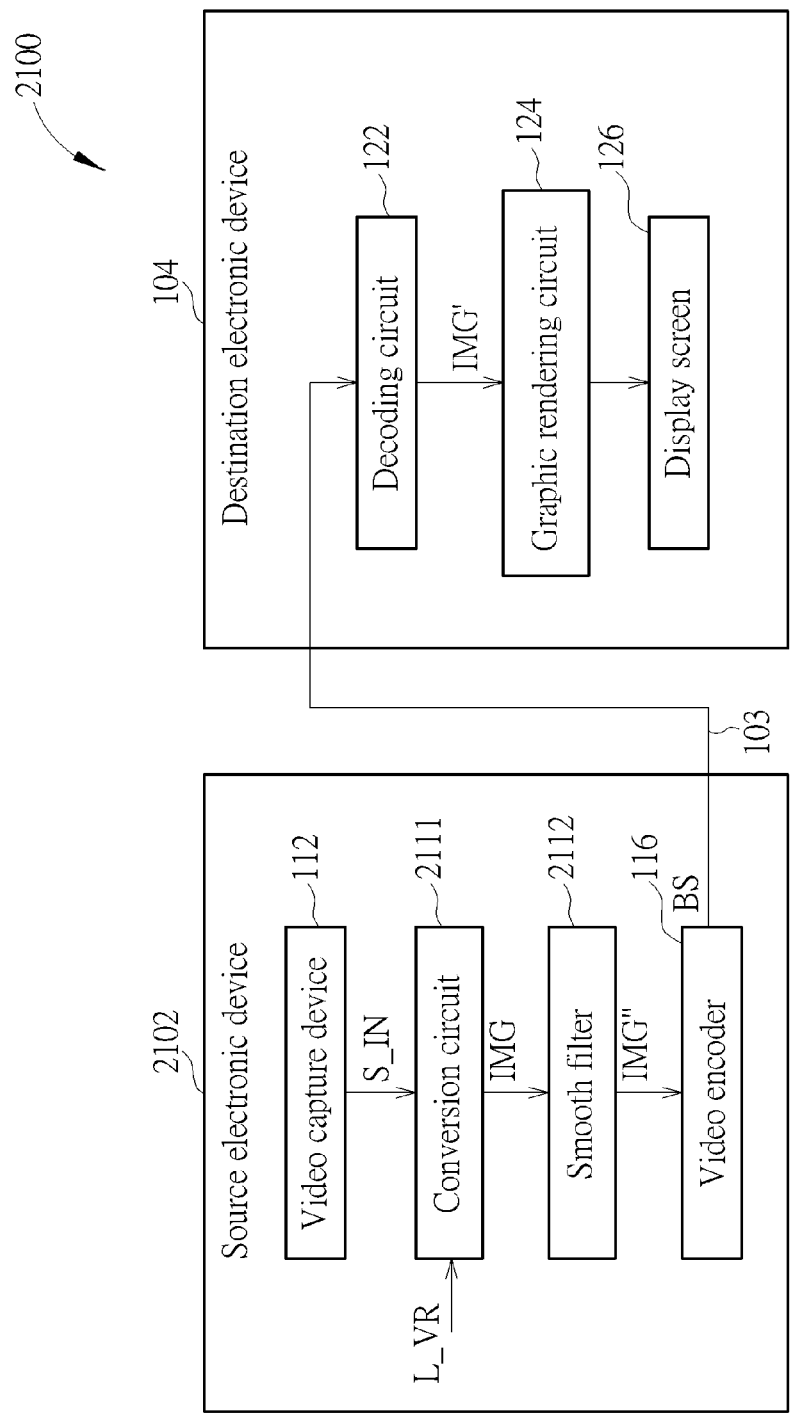
FIG. 21 is a diagram illustrating a fifth 360 VR system according to an embodiment of the present invention.

FIG. 21 is a diagram illustrating a fifth 360 VR system according to an embodiment of the present invention. A conversion circuit 2111 at an encoder side (i.e., a source electronic device 2102) generates a projection-based frame IMG with a 360 VR projection layout L_VR according to the omnidirectional image/video content S_IN. In this embodiment, the 360 VR projection layout L_VR is set by a viewport-based projection layout (e.g., a viewport-based pyramid projection layout, a truncated square pyramid projection layout, or a viewport-based cube projection layout). Hence, the projection-based frame IMG has a main-view projection face and a plurality of non-main-view projection faces packed in the viewport-based projection layout. The source electronic device 2102 further has a smooth filter 2112 coupled between the conversion circuit 2111 and the video encoder 116. The smooth filter 2112 is arranged to apply smooth filtering to at least a portion (i.e., part or all) of the image content represented in the non-main-view projection faces, and output a smooth-filtered frame IMG" to the video encoder 116. For example, the smooth filter 2112 may be an adaptive smooth filter that is capable of applying different smooth filtering operations (e.g., smooth filtering with different strengths) to different areas in the image content represented in the non-main-view projection faces. The video encoder 116 is an encoding circuit used to encode/compress the smooth-filtered frame IMG" to generate a part of a bitstream BS. Further, the video encoder 116 outputs the bitstream BS to the destination electronic device 104 via a transmission means 103. Further details of the smooth filter (e.g., adaptive smooth filter) 2112 are described as below.

Figure 22:
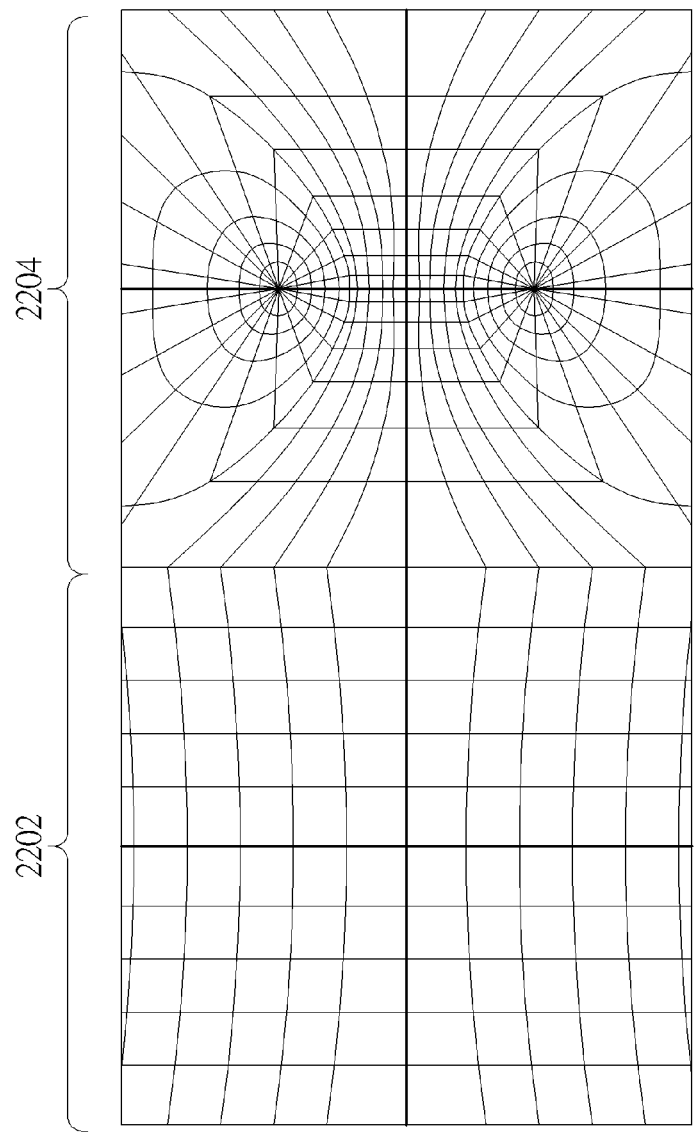
FIG. 22 is a diagram illustrating a distribution of longitude lines and latitude lines in a viewport-based pyramid projection layout according to an embodiment of the present invention.

FIG. 22 is a diagram illustrating a distribution of longitude lines and latitude lines in a viewport-based pyramid projection layout according to an embodiment of the present invention. A longitude and latitude ERP map is converted to the viewport-based pyramid projection layout. A partial image 2202 is represented by the base projection face corresponds to the main view, and a partial image 2204 is represented by four lateral projection faces correspond to a non-main view. Different horizontal FOV (field of view) ranges can be defined by longitude lines shown in FIG. 22. Different vertical FOV ranges can be defined by latitude lines shown in FIG. 22. Hence, the partial image 2204 of the non-main view can be divided into several areas according to FOV ranges.

Figure 23:
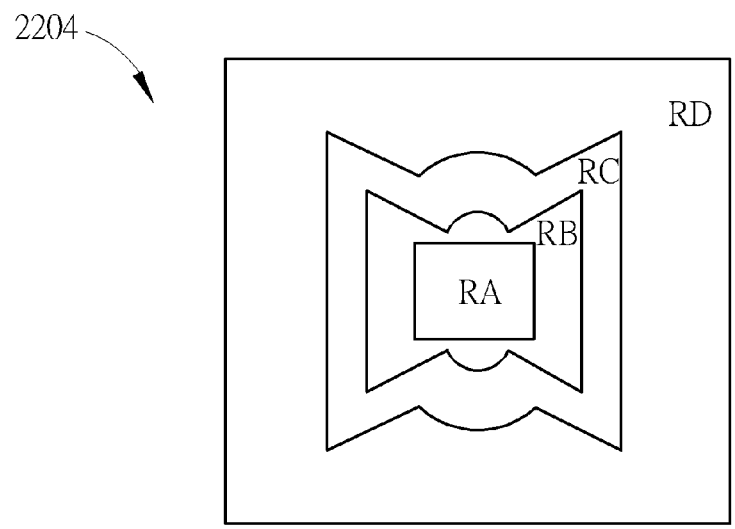
FIG. 23 is a diagram illustrating a first partitioning design of a partial image of the non-main view according to an embodiment of the present invention.

FIG. 23 is a diagram illustrating a first partitioning design of the partial image 2204 of the non-main view according to an embodiment of the present invention. An area in the partial image 2204 can be defined by a vertical FOV range (vFOV) and a horizontal FOV range (hFOV). In this embodiment, the partial image 2204 is divided into a plurality of areas RA, RB, RC, and RD. The area RA has an FOV range defined by vFOV 180° and hFOV≥180°. The area RB has an FOV range defined by 180°>vFOV≥150° and 180°>hFOV≥150°. The area RC has an FOV range defined by 150°>vFOV≥120° and 150°>hFOV 120°. The area RD has an FOV range defined by 120°>vFOV≥90° and 120°>hFOV≥90°. However, this is for illustrative purposes only, and is not meant to be a limitation of the present invention. In practice, the partial image 2204 may be divided into areas according to a different combination of FOV ranges.

The image content represented in the area RD is closer to the main view than the image content represented in the area RC, the image content represented in the area RC is closer to the main view than the image content represented in the area RB, and the image content represented in the area RB is closer to the main view than the image content represented in the area RA. Hence, the smooth filter 2112 applies a first smooth filtering operation with a first smooth filtering strength S1 to the area RD, applies a second smooth filtering operation with a second smooth filtering strength S2 to the area RC, applies a third smooth filtering operation with a third smooth filtering strength S3 to the area RB, and applies a fourth smooth filtering operation with a fourth smooth filtering strength S4 to the area RA, where S4>S3>S2>S1. When a stronger smooth filtering strength is employed, a more blurry area is output from the smooth filter 2112, and may be coded using a smaller number of bits. When a weaker smooth filtering strength is employed, a less blurry area is output from the smooth filter 2112, and may be coded using a larger number of bits.

Figure 24:
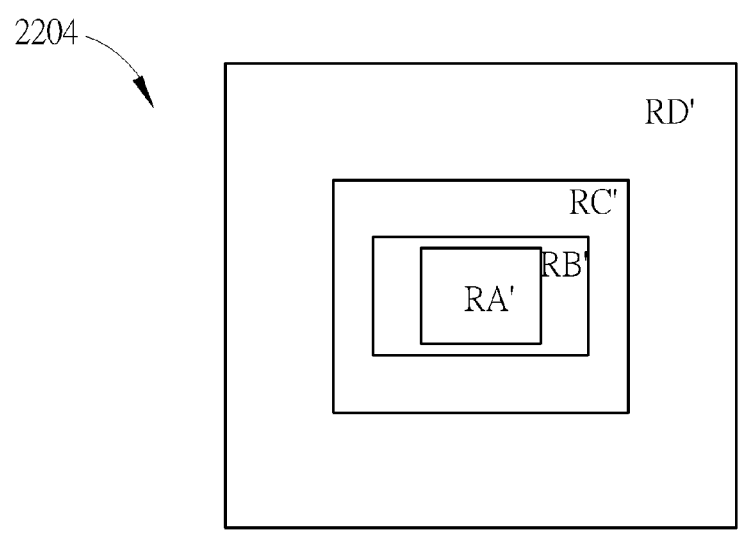
FIG. 24 is a diagram illustrating a second partitioning design of a partial image of the non-main view according to an embodiment of the present invention.

To simplify the actual implementation of the smooth filter 2112, rectangular boundaries may be employed for defining a plurality of areas in the partial image 2204. FIG. 24 is a diagram illustrating a second partitioning design of the partial image 2204 of the non-main view according to an embodiment of the present invention. A rectangular boundary of an area in the partial image 2204 can be computed from a vertical FOV range (vFOV) and a horizontal FOV range (hFOV). In this embodiment, the partial image 2204 is divided into a plurality of areas RA', RB', RC', and RD' according to rectangular boundaries. For example, the area RA' shown in FIG. 24 may be the same as the area RA shown in FIG. 23. Hence, the area RA' is a square area with an FOV range defined by vFOV≥180° and hFOV≥180°. The area RB' shown in FIG. 24 is smaller than the area RB shown in FIG. 23, where an outer rectangular boundary of the area RB' is fully within an FOV range defined by 180°>vFOV≥150° and 180°>hFOV≥150°. The area RC' shown in FIG. 24 is smaller than the area RC shown in FIG. 23, where an outer rectangular boundary of the area RC' is fully within an FOV range defined by 150°>vFOV≥120° and 150°>hFOV≥120°. The area RD' shown in FIG. 24 is larger than the area RD shown in FIG. 23, where an inner rectangular boundary of the area RD' is not fully within an FOV range defined by 120°>vFOV≥90° and 120°>hFOV≥90°.

The image content represented in the area RD' is closer to the main view than the image content represented in the area RC', the image content represented in the area RC' is closer to the main view than the image content represented in the area RB', and the image content represented in the area RB' is closer to the main view than the image content represented in the area RA'. Hence, the smooth filter 2112 applies a first smooth filtering operation with a first smooth filtering strength S1' to the area RD', applies a second smooth filtering operation with a second smooth filtering strength S2' to the area RC', applies a third smooth filtering operation with a third smooth filtering strength S3' to the area RB', and applies a fourth smooth filtering operation with a fourth smooth filtering strength S4' to the area RA', where S4'>S3'>S2'>. When a stronger smooth filtering strength is employed, a more blurry area is output from the smooth filter 2112, and may be coded using a smaller number of bits. When a weaker smooth filtering strength is employed, a less blurry area is output from the smooth filter 2112, and may be coded using a larger number of bits.

Figure 25:
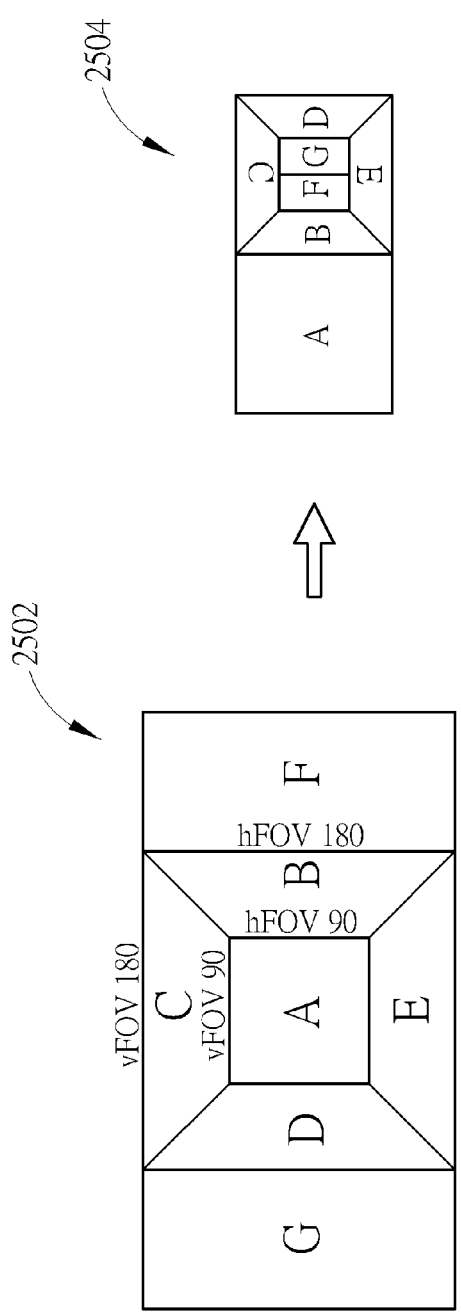
FIG. 25 is a diagram illustrating a viewport-based projection layout derived from an ERP layout according to an embodiment of the present invention.

FIG. 25 is a diagram illustrating a viewport-based projection layout derived from an ERP layout according to an embodiment of the present invention. An ERP layout 2502 can be directly converted into the proposed viewport-based projection layout 2504. A single projection face is obtained by equirectangular projection of an omnidirectional image/video content of a sphere (e.g., sphere 202 shown in FIG. 2). Different horizontal FOV ranges can be defined by longitude of the ERP layout 2502. Different vertical FOV ranges can be defined by latitude of the ERP layout 2502. Hence, the single projection face in the ERP layout 2502 is divided into a plurality of areas (labeled by letters "A", "B", "C", "D", "E", and "F") according to FOV ranges. In this embodiment, the image content of the area "A" corresponds to the user's viewport (i.e., main view), and the image contents of the areas "B"-"F" correspond to the non-main view. The symbol "vFOV 90" shown in FIG. 25 is indicative of vFOV=90°, the symbol "vFOV 180" shown in FIG. 25 is indicative of vFOV=180°, the symbol "hFOV 90" shown in FIG. 25 is indicative of hFOV=90°, and the symbol "hFOV 180" shown in FIG. 25 is indicative of hFOV=180°. In this example, the area "A" has an FOV range bounded by vFOV 90 and hFOV 90. However, the area "A" may be adjustable, where hFOV and vFOV are adjustable in a range {0°, 180°}.

After the single projection face in the ERP layout 2502 is divided into the areas "A"-"F", each of the areas "B"-"F" is properly re-sampled to adjust its shape and/or size, and then the area "A" and the re-sampled areas "B"-"F" are packed in the viewport-based projection layout 2504. It should be noted that the orientation of a letter "A"/"B"/"C"/"D"/"E"/"F" indicates the orientation of a corresponding area labeled by the letter "A"/"B"/"C"/"D"/"E"/"F".

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A video processing method comprising:
    receiving an omnidirectional content corresponding to a sphere;
    obtaining a plurality of projection faces from the omnidirectional content of the sphere according to a pyramid projection;
    creating, by a padding circuit, at least one padding region; and
    generating a projection-based frame by packing the projection faces and said at least one padding region in a pyramid projection layout, wherein the projection faces packed in the pyramid projection layout comprise a first projection face; said at least one padding region packed in the pyramid projection layout comprises a first padding region; the first padding region connects with at least the first projection face, and forms at least a portion of one boundary of the pyramid projection layout;
    wherein the projection faces comprises a base projection face, a first lateral projection face, a second lateral projection face, a third lateral projection face, and a fourth lateral projection face packed in the pyramid projection layout a first side of the base projection face connects with a first side of the first lateral projection face; a second side of the first lateral projection face connects with a first side of the second lateral projection face; a second side of the second lateral projection face connects with a first side of the third lateral projection face; a second side of the third lateral projection face connects with a first side of the fourth lateral projection face; a second side of the fourth lateral projection face connects with a third side of the first lateral projection face; and the first projection face is one of the base projection face, the first lateral projection face, the second lateral projection face, the third lateral projection face, and the fourth lateral projection face.

2. The video processing method of claim 1, wherein
    said at least one padding region packed in the pyramid projection layout further comprises a second padding region, a third padding region, and a fourth padding region; the first padding region connects with a second side of the base projection face and a third side of the second lateral projection face, and forms a first boundary of the pyramid projection layout; the second padding region connects with a third side of the third lateral projection face, and forms a second boundary of the pyramid projection layout; the third padding region connects with a third side of the base projection face, and forms a third boundary of the pyramid projection layout; and the fourth padding region connects with a fourth side of the base projection face and a third side of the fourth lateral projection face, and forms a fourth boundary of the pyramid projection layout.

3. The video processing method of claim 1, wherein generating said
    at least one padding region comprises:
    applying geometry padding to the first projection face to determine pixel values of pixels included in the first padding region.

4. The video processing method of claim 1, wherein generating said
    at least one padding region comprises:
    setting pixel values of pixels included in the first padding region by duplicating pixel values of specific pixels included in the first projection face.

5. The video processing method of claim 4, wherein the first padding region connects with one side of the first projection face, and the specific pixels comprise boundary pixels at said one side of the first projection face.

6. The video processing method of claim 4, wherein the first padding region connects with one side of the first projection face, and the specific pixels do not comprise boundary pixels at said one side of the first projection face.

7. The video processing method of claim 1, further comprising:
    encoding the projection-based frame with the projection faces and said at least one padding region packed in the pyramid projection layout to generate a part of a bitstream.

8. The video processing method of claim 7, further comprising:
    decoding the part of the bitstream to generate a decoded projection-based frame with the projection faces and said at least one padding region packed in the pyramid projection layout, comprising:
    reconstructing a first pixel included in the first projection face by blending a decoded pixel value of the first pixel and a decoded pixel value of a second pixel included in said at least one padding region.

9. The video processing method of claim 8, wherein a pixel value of the second pixel included in said at least one padding region packed in the projection-based frame is generated by duplicating a pixel value of the first pixel included in the first projection face packed in the projection-based frame.

10. The video processing method of claim 9, wherein a reconstructed pixel value of the first pixel is computed by using a following formula:

$$S_{REC} = \frac{(M-N)*T + (M+N)*S + M}{2*M}$$

where $S_{REC}$ represents the reconstructed pixel value of the first pixel, S represents the decoded pixel value of the first pixel, T represents the decoded pixel value of the second pixel, M represents a blending width, and N represents a distance between the first pixel and a boundary of the first projection face that connects with the first padding region.

* * * * *